United States Patent
Pohlack et al.

(10) Patent No.: US 10,698,668 B1
(45) Date of Patent: Jun. 30, 2020

(54) CUSTOM CODE TRANSFORMATIONS DURING COMPILATION PROCESS

(71) Applicant: Amazon Technologies, Inc., Seattle, WA (US)

(72) Inventors: Martin Thomas Pohlack, Dresden (DE); Pawel Piotr Wieczorkiewicz, Dresden (DE)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/992,074

(22) Filed: May 29, 2018

(51) Int. Cl.
*G06F 9/44* (2018.01)
*G06F 9/46* (2006.01)
(Continued)

(52) U.S. Cl.
CPC ............... *G06F 8/427* (2013.01); *G06F 8/30* (2013.01); *G06F 8/451* (2013.01); *G06F 8/71* (2013.01);
(Continued)

(58) Field of Classification Search
CPC .... G06F 11/3676; G06F 11/3466; G06F 8/41; G06F 8/451; G06F 8/443; G06F 8/48; G06F 8/433; G06F 8/4434; G06F 8/76; G06F 8/52; G06F 8/656; G06F 8/33; G06F 8/65; G06F 8/71; G06F 9/45516;
(Continued)

(56) References Cited

U.S. PATENT DOCUMENTS 5,201,039 A * 4/1993 Sakamura ........... G06F 9/30101
711/201
5,375,242 A * 12/1994 Kumar .................... G06F 8/443
717/147
(Continued)

OTHER PUBLICATIONS

Andrew Kennedy, Compiling with Continuations, Continued , Oct. 1-3, 2007, [Retrieved on Feb. 20, 2020]. Retrieved from the internet: <URL: https://dl.acm.org/doi/pdf/10.1145/1291151.1291179?download=true> 14 Pages (177-190) (Year: 2007).*
(Continued)

*Primary Examiner* — Anibal Rivera
(74) *Attorney, Agent, or Firm* — Robert C. Kowert; Kowert, Hood, Munyon, Rankin & Goetzel, P.C.

(57) ABSTRACT

Computer systems and associated methods are disclosed for performing custom code transformations using a compiler that does not support the custom transformations. In embodiments, a wrapper program intercepts a command to the compiler. The wrapper program generates intermediate code using the compiler in accordance with the command. The wrapper program then performs the code transformations on the intermediate code using a code transformer, for example, by performing a search and replace operation to replace particular code sequences in the intermediate code. The wrapper program then generates the binary code from the transformed intermediate code in accordance with the command. In this manner, software may be compiled with the custom code transformations without extensive changes to the source code or the compiler. In one application, the technique may be used to build a hot patch that applies a
(Continued)

security update to a software using the software's original compiler.

20 Claims, 12 Drawing Sheets

(51) Int. Cl.
| | |
|---|---|
| G06F 11/34 | (2006.01) |
| G06F 17/50 | (2006.01) |
| G06F 8/41 | (2018.01) |
| G06F 21/57 | (2013.01) |
| G06F 8/30 | (2018.01) |
| G06F 8/71 | (2018.01) |
| G06F 11/36 | (2006.01) |
| G06F 9/455 | (2018.01) |
| G06F 8/65 | (2018.01) |

(52) U.S. Cl.
CPC .............. *G06F 21/572* (2013.01); *G06F 8/65* (2013.01); *G06F 9/45504* (2013.01); *G06F 11/3466* (2013.01); *G06F 11/3636* (2013.01); *G06F 11/3676* (2013.01)

(58) Field of Classification Search
CPC .. G06F 9/45504; G06F 15/17318; G06F 8/30; G06F 8/444; G06F 8/70; G06F 8/36; G06F 9/30032; G06F 9/485; G06F 9/526; G06F 11/0778; G06F 11/3644; G06F 11/362; G06F 8/427; G06F 11/3636
See application file for complete search history.

(56) References Cited

U.S. PATENT DOCUMENTS

| | | | | |
|---|---|---|---|---|
| 5,940,620 A * | 8/1999 | Graham | ................ | G06F 8/4443 717/146 |
| 6,230,114 B1 * | 5/2001 | Hellestrand | ........... | G06F 11/261 703/13 |
| 6,247,174 B1 * | 6/2001 | Santhanam | ............. | G06F 8/447 717/154 |
| 6,263,302 B1 * | 7/2001 | Hellestrand | ........... | G06F 11/261 703/17 |
| 6,463,582 B1 * | 10/2002 | Lethin | ................. | G06F 9/45504 717/138 |
| 6,748,584 B1 * | 6/2004 | Witchel | .................... | G06F 8/71 714/37 |
| 7,165,242 B2 * | 1/2007 | Dmitriev | ............. | G06F 11/3466 717/130 |
| 7,367,023 B2 * | 4/2008 | Adolphson | ........... | G06F 8/4434 717/142 |
| 7,506,318 B1 * | 3/2009 | Lindo | ................. | G06F 11/3644 717/130 |
| 7,958,497 B1 * | 6/2011 | Lindo | ................. | G06F 11/3636 714/799 |
| 8,261,247 B2 * | 9/2012 | Arnold | .................... | G06F 8/656 717/140 |
| 8,510,723 B2 * | 8/2013 | Barua | ....................... | G06F 8/52 717/136 |
| 8,813,079 B1 * | 8/2014 | Lindo | ..................... | G06F 9/526 718/100 |
| 8,966,463 B2 * | 2/2015 | Sathyanathan | ....... | G06F 8/4441 717/157 |
| 9,021,448 B1 * | 4/2015 | Gagliardi | ................. | G06F 8/36 717/130 |
| 9,038,048 B2 * | 5/2015 | Yang | ........................ | G06F 8/65 717/110 |
| 9,223,570 B2 * | 12/2015 | Kannan | ..................... | G06F 8/76 |
| 9,342,285 B2 * | 5/2016 | Li | ............................. | G06F 8/48 |
| 9,477,461 B1 * | 10/2016 | Korotaev | ............ | G06F 16/2228 |
| 9,696,966 B2 * | 7/2017 | Edwards | ................... | G06F 8/30 |
| 9,798,649 B1 * | 10/2017 | Bettendorff | ........... | G06F 11/362 |
| 9,977,759 B2 * | 5/2018 | Suzuki | .............. | G06F 15/17318 |
| 10,261,889 B2 * | 4/2019 | Asthana | ................... | G06F 8/443 |
| 2003/0167458 A1 * | 9/2003 | Santhanam | ............... | G06F 8/41 717/114 |
| 2004/0003278 A1 * | 1/2004 | Chen | ....................... | G06F 21/14 726/21 |
| 2004/0261064 A1 * | 12/2004 | Goldstein | ................. | G06F 8/48 717/140 |
| 2005/0010912 A1 * | 1/2005 | Adolphson | ........... | G06F 8/4434 717/151 |
| 2005/0251791 A1 * | 11/2005 | Hundt | ................. | G06F 11/3466 717/130 |
| 2007/0011415 A1 * | 1/2007 | Kaakani | .............. | G06F 12/0269 711/159 |
| 2007/0261033 A1 * | 11/2007 | Chen | ................... | G06F 11/3466 717/130 |
| 2008/0127118 A1 * | 5/2008 | Kasman | ............. | G06F 11/3644 717/130 |
| 2008/0263529 A1 * | 10/2008 | Beretta | .................... | G06F 8/443 717/146 |
| 2008/0295114 A1 * | 11/2008 | Argade | .................... | G06F 9/485 719/320 |
| 2008/0301673 A1 * | 12/2008 | Kawasaki | ........... | G06F 9/45516 718/1 |
| 2009/0113402 A1 * | 4/2009 | Chen | ........................ | G06F 8/41 717/140 |
| 2009/0133033 A1 * | 5/2009 | Lindo | ................. | G06F 11/0778 718/108 |
| 2009/0193407 A1 * | 7/2009 | Lepeska | ..................... | G06F 8/65 717/170 |
| 2009/0287729 A1 * | 11/2009 | Chen | ................... | G06F 11/3676 |
| 2010/0058034 A1 * | 3/2010 | Zaks | ....................... | G06F 8/433 712/216 |
| 2010/0293342 A1 * | 11/2010 | Morfey | ............... | G06F 9/30032 711/154 |
| 2010/0306746 A1 * | 12/2010 | Barua | ....................... | G06F 8/52 717/136 |
| 2012/0102476 A1 * | 4/2012 | Yu | ........................... | G06F 8/656 717/168 |
| 2012/0117552 A1 * | 5/2012 | Krishnaiyer | .......... | G06F 8/4441 717/160 |
| 2013/0139136 A1 * | 5/2013 | Sathyanathan | ....... | G06F 8/4441 717/157 |
| 2013/0159981 A1 * | 6/2013 | Klemenz | ................. | G06F 8/427 717/143 |
| 2013/0205123 A1 * | 8/2013 | Vorbach | ............... | G06F 9/30043 712/221 |
| 2014/0157232 A1 * | 6/2014 | Li | ............................. | G06F 8/48 717/110 |
| 2014/0245271 A1 * | 8/2014 | Miller | .................... | G06F 8/423 717/146 |
| 2014/0282431 A1 * | 9/2014 | Delio, Jr. | ............ | G06F 11/3466 717/130 |
| 2014/0282439 A1 * | 9/2014 | Kannan | ..................... | G06F 8/76 717/140 |
| 2015/0212838 A1 * | 7/2015 | Pirvu | .................... | G06F 9/4552 717/148 |
| 2016/0188305 A1 * | 6/2016 | Rong | ....................... | G06F 8/31 717/154 |
| 2016/0196112 A1 * | 7/2016 | Edwards | ................... | G06F 8/30 717/107 |
| 2016/0291942 A1 * | 10/2016 | Hutchison | ............... | G06F 8/451 |
| 2016/0357703 A1 * | 12/2016 | Suzuki | ............... | G06F 12/0811 |
| 2018/0364991 A1 * | 12/2018 | Montelisciani | ..... | G06F 9/45533 |
| 2019/0205240 A1 * | 7/2019 | Craik | ................... | G06F 8/4443 |

OTHER PUBLICATIONS

Avinash Malik et al., SystemJ Compilation Using the Tandem Virtual Machine Approach, May 2009, [Retrieved on Feb. 20, 2020]. Retrieved from the internet: <URL: https://dl.acm.org/doi/pdf/10.1145/1529255.1529256?download=true> 37 Pages (1-37) (Year: 2009).*

Moritz Lipp et al "Meltdown" pp. 1-16.

(56) References Cited

OTHER PUBLICATIONS

Dmitry Evtyushkin "Jump Over ASLR: Attacking Branch Predictors to Bypass ASLR" pp. 1-13.
Paul Turner et al "Retpoline: a software construct for preventing branch-target-injection" 2018, pp. 1-10.
White Paper "Retpoline: A Branch Target Injection Mitigation" Feb. 2018, pp. 1-21.
Paul Kocher et al "Spectre Attacks: Exploiting Speculative Execution" pp. 1-16.

* cited by examiner

| indirect branch instruction 260 | replacement sequence 262 |
|---|---|
| `jmp *%rax` | 1:    `call load_label`<br>       `capture_ret_spec:`<br>2:    `pause; lfence`<br>3:    `jmp capture_ret_spec`<br>`load_label:`<br>4:    `mov %rax, (%rsp)`<br>5:    `ret` | speculative execution captured 264

*FIG. 2B*

| indirect call instruction 270 | replacement sequence 272 |
|---|---|
| `call *%rax` | 1:    `jmp label2`<br>`label0:`<br>2:    `call label1`<br>`capture_ret_spec:`<br>3:    `pause; lfence`<br>4:    `jmp capture_ret_spec`<br>`label1:`<br>5:    `mov %rax, (%rsp)`<br>6:    `ret`<br>`label2:`<br>7:    `call label0` |

*FIG. 2C*

CUSTOM CODE TRANSFORMATIONS DURING COMPILATION PROCESS

BACKGROUND

Compilers are software programs that convert source code written in a high-level language such as C to binary code that can be executed by a target microprocessor. Thus, the compiler translates high level instructions written by the software developer to a format that can be read and understood by the microprocessor.

The behavior of compilers may change from version to version. For example, the GCC compiler has seen significant changes in its feature set and compilation behavior over successive versions, so that the same source code will compile to a very different executable under a different compiler version, or more often, fail to compile at all. This changing of behavior in the compiler presents a number of difficulties to a software owner who may wish to recompile a software that was built using an old version of the compiler with a new version that includes a desired compiler feature. The rebuilding generally requires the software owner to make significant modifications to the software's source code or backport the feature to the old compiler. Both of these options can be extremely difficult and time-consuming. In another context, it is sometimes desirable to generate a hot patch for a software system that can be applied while the system is executing. In most cases, such a hot patch must be created using the same version of the compiler that generated the other portions of the system. Unfortunately, desired compiler features that are needed for the hot patch may not have been backported to the original compiler version. In practice, these problems mean that software owners must maintain not only their own source code, but a version of the compiler that is compatible with the source code, in order to support the creation of future hot patches.

BRIEF DESCRIPTION OF THE DRAWINGS

FIGS. 2A-2C illustrate an example compile-time code transformation that can be employed to mitigate a type of branch-prediction-based attack, according to some embodiments.

Figure 1:
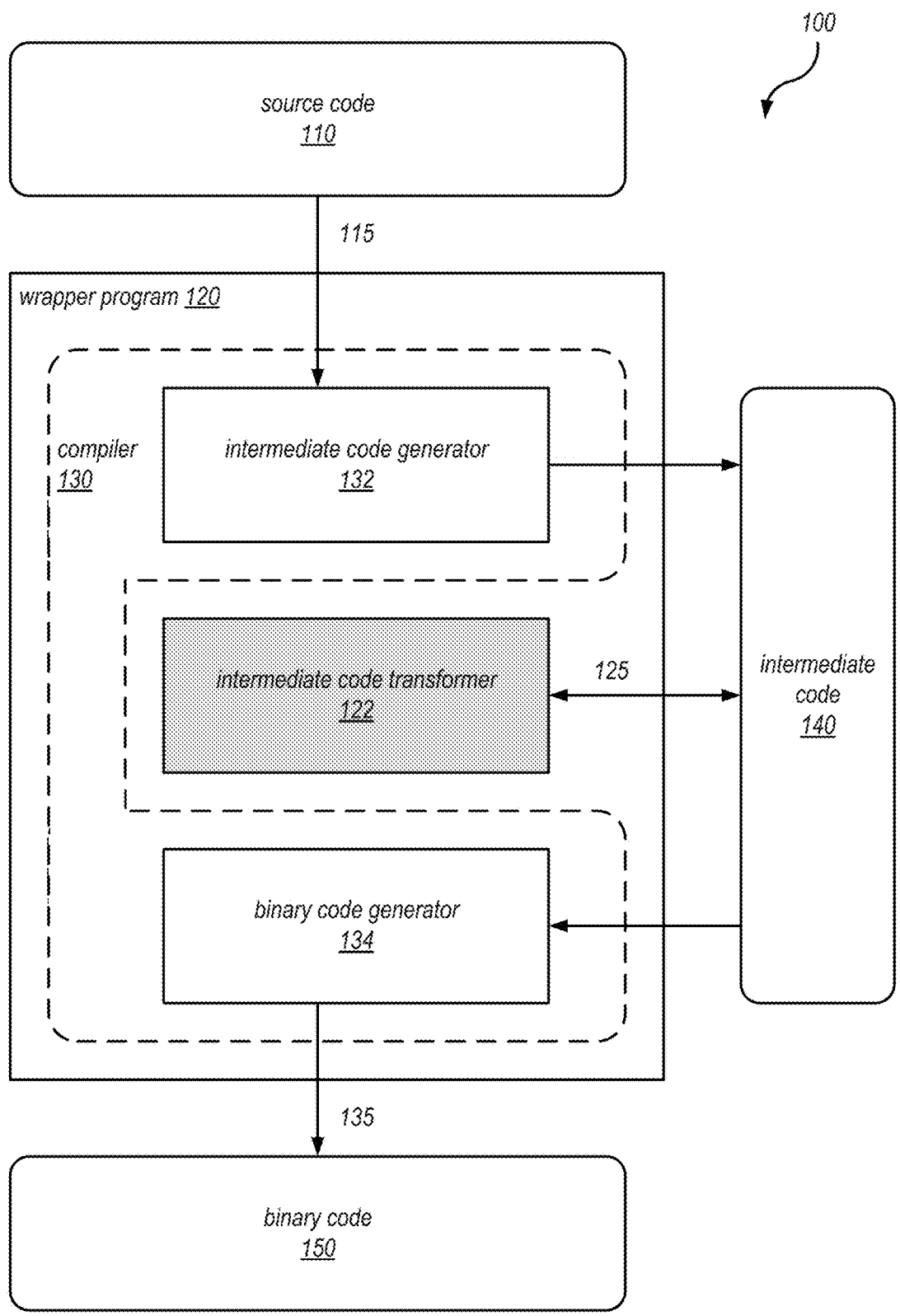
FIG. 1 is a block diagram illustrating an example compiler system that has been adapted to perform custom code transformations into a compilation process, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

The systems and methods described herein may be used to implement a compiler system that allows users to inject custom code transformations into the compilation process.

Software systems sometimes need to be recompiled to receive the benefit of new features implemented in later versions of the compiler. For example, in one situation, a new security update that is useful to the software system may be implemented only in a new version of a compiler. As another example, a newer version of the compiler may insert code instrumentation or optimization features into the software using compiler features were not available in the original version of the compiler.

However, because compiler behavior may change drastically from one version to the next, a new version of the compiler cannot generally be used to recompile the source code written for an old version of the compiler. For example, in some cases, the source code may make certain assumptions about the compiler that are no longer true in the new version. If such source code is recompiled using the new version of the compiler, they may generate executables that behave differently from the existing executables. In many cases, such source code may fail to compile at all under the new version of the compiler. Thus, in order to perform the recompilation with the desired compiler features, software owners must either make significant modifications to the source code or backport the desired features to the old compiler. Both of these options are extremely difficult and time-consuming.

In another context, it is sometimes desirable to generate a hot patch for a software system that can be applied while the system continues execution. For example, continually executing platform software such as operating systems or hypervisors may need to be patched without causing client-disrupting reboots. However, in most cases, a hot patch must be created using the same version of the compiler that generated the other portions of the system. Unfortunately, the desired compiler features that are needed for the hot patch may not be available in the original compiler version. Thus, the creation of the hot patch again requires the software owner to modify the source code or backport the desired features to the old compiler.

Accordingly, in order to mitigate these problems with existing compiler systems, embodiments of systems and methods disclosed herein describe a technique to compile the source code using the old version of the compiler and without making significant changes to the source code. Specifically, the compiler system introduces a new compilation stage during the compilation process that injects custom code transformations to the assembly or intermediate code generated during the compilation process. The custom code transformations may be written to implement the desired compilation features that are not available in the old version of the compiler. As may be understood, this approach enables software owners to easily augment the old version of the compiler with later compiler features, without changing the actual compiler. In some embodiments, the custom code transformations may be used to flexibly customize the compilation process in other ways. For example, the code transformations may be performed to add custom instrumentation to the software system, to allow the system to collect, analyze, and/or report the system's runtime performance data.

In some embodiments, the augmented compiler system may be implemented using a wrapper program. In some embodiments, the wrapper program may be configured to intercept all invocations to the compiler. In some embodiments, the wrapper may present an interface, such as a command interface, that accepts all commands that are acceptable to the compiler. In some embodiments, the wrapper will invoke the compiler to perform certain stages of the compilation process, and a code transformer to perform the custom code transformation stage. For example, in some embodiments, the wrapper may call the compiler to parse the source code and generate the assembly instructions, and to perform the assembly and linking stages of the compilation process. On the other hand, the wrapper may call a code transformer to modify the assembly or intermediate code to implement a custom security update. In some embodiments, the code transformer may perform a search and replace operation to look for code sequences within the intermediate code files and replace them with replacement code sequences. In some embodiments, as part of a security update, indirect call and jump instructions may be replaced with code sequences to mitigate vulnerabilities caused by hardware speculative execution of these instructions. In some embodiments, the code transformation may add instrumentation to the intermediate code, to collect execution data for tools to perform code coverage or heatmap analysis.

As may be understood, the disclosed techniques improve upon existing compiler systems in that they allow newer and custom compiler features to be implemented in older versions of the compiler, without extensive changes to the old compiler or the source code. The technique also opens up the compiler system to allow users to inject a variety of custom features to the compilation process. By using the wrapper program, the existing clients of the compiler (e.g., existing build scripts) need not be changed at all. In some embodiments, the wrapper itself may expose a set of augmented controls to control the code transformation stage of the process, including for example control parameters to select the code transformer. These and other features and benefits of the inventive system and method are described in more detail below, in connections with the figures.

FIG. 1 is a block diagram illustrating an example compiler system that has been adapted to perform custom code transformations into a compilation process, according to some embodiments. In some embodiments, the compiler system 100 may be hosted on a computer system, such as the computer system illustrated in FIG. 10.

As shown, the compiler system 100 may include a wrapper program 120. The wrapper program 120 may consume 115 the source code 110, which may be for example human-readable code that implement the functionality of a software system. In some embodiments, the wrapper program 120 may be invoked via a command line command. In some embodiments, the wrapper program 120 may be invoked via other user interfaces (UIs) or application programming interfaces (APIs).

In some embodiments, the wrapper program 120 may be implemented with a shell script. In some embodiments, the wrapper program 120 may be implemented in part in binary code. In some embodiments, the wrapper program 120 may replicate or augment the invocation interface of a compiler 130. For example, in some embodiments, the compiler 130 may be called via the command line, and commands to the compiler may include various command line flags that control the behavior of the compiler. For example, the GCC compiler accepts many documented command line parameters. In some embodiments, the wrapper program 120 may parse a received invocation command to determine the command flags, and then invoke the compiler 130 using the same command flags.

In some embodiments, the wrapper program 120 may be configured to intercept all invocations to the compiler 130. For example, in some embodiments, the configuration settings may be modified so that the execution path of the compiler 130 or certain environment variables referring to the compiler 130 are updated to refer instead to the wrapper program 120. In this manner, no changes are needed for clients that invoke the compiler 130. For example, any build scripts that previously called the compiler 130 may be automatically redirected to invoke the wrapper program 120 without any changes to their code or processes.

In some embodiments, as shown, the compiler 130 may contain an intermediate code generator 132 and a binary code generator 134. The intermediate code generator 132 may be used to perform a stage in the compilation process where the source code 110 is compiled to generate the intermediate code 140. The binary code generator 134 may be used to perform another stage in the compilation process where the intermediate code 140 is compiled to generate binary code 150. Depending on the compilation command or input, the binary code 150 may be unlinked object files, or fully linked executables.

In some embodiments, the compilation process may be divided into stages. For example, a C language compiler may first perform a preprocessing stage, where the compiler 130 interprets certain preprocessor commands, which may be embedded in the source code 110, to make inline changes to the source code. For example, during this stage, # include files may be added, and defined macros will be inserted. In some embodiments, the compiler 130 may generate, from the preprocessed source code, the intermediate code 140. In some embodiments, the intermediate code 140 be assembly code that is targeted towards a processor family. For example, the intermediate code may contain assembly instructions that are specific to the target processor architecture. In some embodiments, the intermediate code 140 may be generated in a human readable language and saved as one or more files. In some embodiments, the intermediate code 140 may not be generated by the compiler 130 by default. Thus, special command flags or invocation parameters may be added by the wrapper to instruct the compiler to generate the intermediate code 140.

In some embodiments, the next stage of the compilation process may assemble the intermediate code 140 to generate binary code 150. In some embodiments, the binary code may represent actual instructions that are to be executed by the target processor. In some embodiments, depending on the command flags or input parameters, the binary code may be unlinked object code. In some embodiments, the binary code generator 134 may directly generate fully linked executables. In some embodiments, a linker will perform the next stage of the compilation process. During linking, different segments of object code will be rearranged so that one segment can successfully call functions in other segments. In some embodiments, a fully linked executable program will be generated at the end of the linking stage.

In some embodiments, as shown, the wrapper program 120 may include or invoke an intermediate code transformer 122. The intermediate code transformer 122 may be configured to perform custom transformations 125 on the intermediate code 140, before the intermediate code is used to generate the binary code 150. As long as transformations performed by the transformer 122 are still valid intermediate code, the rest of the compilation process may proceed according to the standard behavior of the compiler 130. Thus, the wrapper program 120 is able to augment the behavior of the compiler 130 by inserting the intermediate code transformer 122 into the compilation process. As discussed, this technique opens up the compiler 130, so that a variety of custom features can be flexibly added to the compilation process.

The intermediate code transformer 122 may be configured to perform a variety of transformations on the intermediate code 140. In some embodiments, the transformer 122 may perform a search-and-replace operation to replace certain sequences of intermediate code with other sequences. In some embodiments, particular instructions or code sequences may be added or removed from the intermediate code 140. The modifications may be done for different purposes, for example, to modify the appearance or execution behavior of the resulting software. For example, code replacement may be used to obfuscate the resulting software of optimize the performance of the resulting software.

In some embodiments, the modifications performed by the transformed by the transformer 122 may apply a security fix to mitigate vulnerabilities in the software. For example, in some embodiments, software on certain platforms may include indirect jump or call instructions, which may be speculatively by the target processor. In some embodiments, this speculative execution may be exploited by attackers to leak protected information within the software to the outsiders. Thus, in some embodiments, the transformer 122 may apply a fix where vulnerable indirect branch instructions are replaced with safer intermediate code sequences. In some embodiments, the fix that is applied does not change the logical execution behavior of the software. However, by using a different instruction sequence to do the same thing, the software prevents certain attacks that target the vulnerable instructions.

In some embodiments, the modifications performed by the transformed by the transformer 122 may add instrumentation to the resulting software. Such code instrumentation may be used for a variety of purposes. For example, in some embodiments, code instrumentation may be added to collect, report, and/or analyze the performance data of the resulting software at runtime. For example, the instrumentation may collect data such as execution counters, execution times, or execution states. In some embodiments, this information may be analyzed either within the resulting software itself or via external analysis tools, in order to obtain useful execution information about the software, such as execution coverage or heatmap data. In some embodiments, the code instrumentation may be added in conjunction with a security fix, so that the instrumentation may be used to collect execution data that are related to the security fix. For example, the instrumentation may be embedded in the replacement code sequences to track how often the replacement sequences are executed. In some embodiments, the instrumentation may be used to report what data locations are loaded in to cache by a potential attacker within certain vulnerable areas of the code. In some embodiments, the instrumentation may collect execution data that can be used to detect an attack.

Figure 2A:
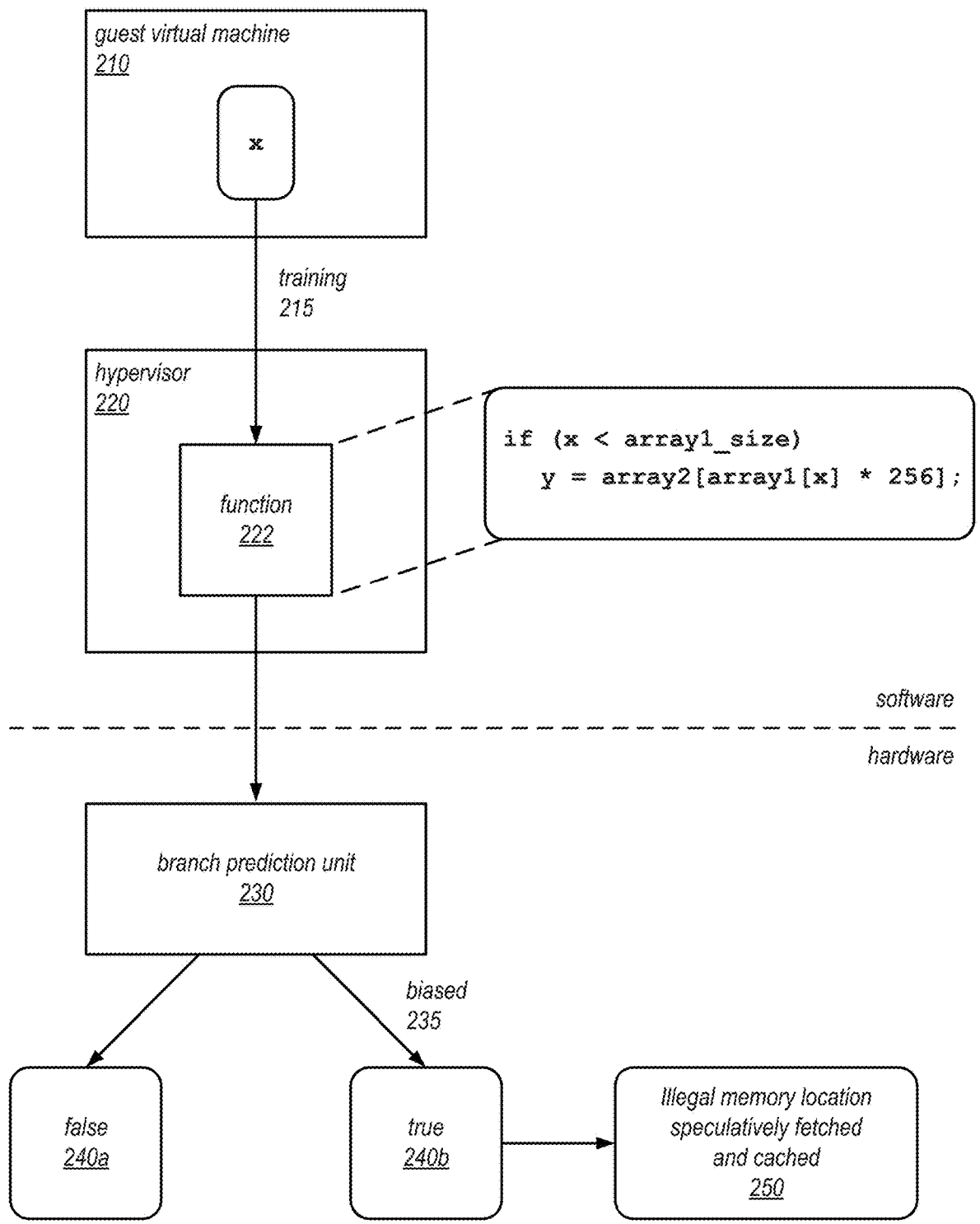

FIGS. 2A-2C illustrate an example compile-time code transformation that can be employed to mitigate a type of branch-prediction-based attack, according to some embodiments.

FIG. 2A depicts high level steps in a branch-prediction-based attack, such as for example, the Meltdown or Spectre attacks, as described in recent literature. In one embodiment, as shown, such an attack may be carried out on a hypervisor 220, which is hosting a guest virtual machine 210.

The hypervisor 220 may include, for example, an administrative instance of an operating system, which may be termed a "domain-zero" or "dom0" operating system in some implementations. The dom0 operating system may not be accessible by clients on whose behalf the virtual computing resources are run. The dom0 operating system may be responsible for various administrative or control-plane operations of the service provider, including for example capturing usage and performance metrics data from the virtual computing resources and the physical computing resources.

A virtual machine (VM) 210 may comprise one or more compute instances with a specified computational capacity (which may be specified by indicating the type and number of CPUs, the main memory size, and so on) and a specified software stack (e.g., a particular version of an operating system, which may in turn run on top of a hypervisor). One or more different computing devices may be used singly or in combination to implement the instances on the virtualization host. The computing devices may include general purpose or special purpose computers, storage devices, network devices and the like. The instances may operate or implement a variety of different platforms, such as application server instances, JAVA virtual machines (JVMs), general purpose or special-purpose operating systems, platforms that support various interpreted or compiled programming languages such as Ruby, Perl, Python, C, C++ and the like, or high-performance computing platforms) suitable for performing client applications. Different instances may have different numbers of virtual CPU cores, and different amounts of memory, cache, storage and/or networking capacity, as well as any other performance characteristic. Configurations of instances may include their location, in a particular data center, availability zone, geographic, location, etc., and (in the case of reserved compute instances) reservation term length.

The guest VM 210 may be instantiated to provide a variety of services that allows clients to use computing resources in a service provider network. These VMs 210 can, for example, provide access to generic compute instances. The service provider network can also provide access to specialized compute instances with specialized functionality, such as routers, domain name systems (DNSs), load balancers, desktop virtualization servers, and the like. The service provider network may include various types of storage services that expose different types of storage access interfaces, including block-based storage services, relational database services, NoSQL database services, file system services, and the like. The service provider network may also include services that provide functionalities of commonly used software modules, which can be used in conjunction with other software to implement larger systems. For example, provided services may include queuing services, notification services, logging services, key storage and management services, and the like. The provided services may include services that implement larger systems with sophisticated functionality, such as machine learning, identity management, software development environments, multi-tenant containers for hosting software tenants, and the like. The services may be standard services provided by the service provider, or services implemented by third parties on top of the standard services. The services may operate on computing resources of the service provider network and may be controlled and configured by clients via various interfaces such as graphical user interface (GUI) (e.g., as part of an administration control panel or web site) and/or as a programmatic interface such as an Application Programming Interface (API). In some embodiments, the service provider operating the hypervisor 220 may not be fully aware of the operations of its guest VMs 210. Thus, in some embodiments, malicious actors may implement an attack via a guest VM 210.

In branch-prediction-based attacks such as the Meltdown or Spectre attacks, an unprivileged process such as the guest VM 210 gains the ability to read data mapped to the address space of the hypervisor 220. This is enabled by a particular feature of the processor that permits out-of-order execution of the instructions of the executable. In particular, in some processors instructions may be speculatively executed based on a branch prediction unit. That is, before the processor is certain whether an instruction will be needed, the instruction is fetched and executed in order to maximize the utilization of all execution units of the processor core. Branch predictors try to determine which direction of branch that execution will take before the branch is actually evaluated. If the prediction is correct, results of the speculative execution may be immediately used. On the other hand, if the prediction was incorrect, the speculative executions are rolled back, and the executing program is not impacted by the results of the speculative execution. However, although speculative execution does not impact the program's logical flow, its effects can be seen in the system, in particular, the processor's cache, which is shared by all hosted processes. Recently, techniques have been disclosed to allow one attacker process on the processor to observe the memory state of another process via the cache state of the other process. In general, cache side-channel attacks such as Evict+Time, Prime+Probe, and Flush+Reload extract information from the shared cache by measuring the time it takes to reload the data. Based on the reload time, the attacker is able to learn whether the victim process has access its own data in the meantime.

In the illustrated example, the guest VM 210 may run a program that manipulates an input variable x. The variable x may be manipulated in a fashion so as to train the hardware branch prediction unit 230 to speculatively execute one side of a branch incorrectly, so as to cause illegal data to be loaded. For example, as shown, the hypervisor 220 may implement a function 222 that assigns the contents of a memory location to the variable y. In logical flow, this function guards the memory access by ensuring that the variable x always stays within a legal range, as shown, less than array1_size. However, despite this explicit condition, the hardware branch prediction unit 230 may speculatively execute instructions that fall outside of the legal range. For example, the guest VM 210 may generate 10 memory access that are legal, followed by an eleventh illegal access. On the eleventh iteration, the branch prediction unit 230 may have been trained to have a bias 235 to perform the illegal memory access. While this illegal access does not impact the logical flow of the program, the illegal memory location that is speculatively fetched is reflected in hardware state, in particular in the shared cache of the processor that can be observed by the attacking VM 210.

FIG. 2B depicts an example fix to mitigate this sort of branch-prediction-based attack. As shown, the fix entails a change at the machine code level, so as to replace indirect branch instructions 260 such as the jump instruction with a code sequence 262 that do not use that particular branch prediction unit.

In this example, the jump is performed to an instruction address stored in the % rax register. In executing this instruction, the processor's speculative execution typically consults the indirect branch predictor and may speculate to an address controlled by an attacker. The replacement sequence 262 employs a call and return construct. The return instruction has an associated cache that holds the return address in a data structure referred to as the return stack buffer (RSB) on certain processors. However, the hardware's cache for the return target (the RSB) and the actual destination of the return, which is maintained on the stack, are different. This allows the code sequence 262 separate the speculative execution from the non-speculative execution and, in this example, trap the speculative execution in a harmless loop 264. This technique is sometimes referred to as "retpoline," which is a combination of the words "return" and "trampoline," because it is written to ensure that any speculative execution "bounce" endlessly.

At line 1, the call load label instruction pushes the address of the instructions at line 2 onto the stack, and the jumps to line 4. At line 4, the mov instruction takes the target of the indirect jump (in % rax) and writes it over the return address stored on the stack. At this point, the return address on the in-memory stack and the RSB differ. Thus, the speculative execution will take one path, and the actual execution will take another path. If the speculating, the processor uses the RSB entry and jumps to line 2. There execution is trapped in an infinite loop. In certain instruction sets, the lfence instruction defines a speculation barrier, which will not execute until all prior instructions have completed. Moreover, certain architectural specifications limit the speculative execution that a processor can perform around the lfence instruction, so including the instruction here may potentially improve performance and represent another tool to mitigate branch-prediction-based attacks. Eventually, the processor realizes that the speculative return address does not agree with the in-memory stack value, and the speculative execution is stopped. Execution then jumps to % rax. Importantly, there was no point during this sequence where speculative execution can be controlled by an external attacker.

FIG. 2C illustrates a similar replacement sequence 272 for an indirect call instruction 270. In this example, the replacement sequence uses two calls. Unlike the indirect branch case, for the call case, the target needs to be able to eventually return control. The outer call (line 2) sets up the return frame, while the inner call (line 7) uses the indirect branch construction discussed in FIG. 2B to perform the actual control transfer.

As discussed, the replacements shown in FIGS. 2B and 2C are example code transformations that may be performed on the intermediate code during a compilation process. Such transformations provide an easier alternative to backporting the security update to an old version of the compiler that may be required for the recompilation. Instead of modifying the compiler itself, the security update can be applied via a custom intermediate code transformer as an extra stage during the compilation process, as discussed in connection with FIG. 1.

Figure 3A:
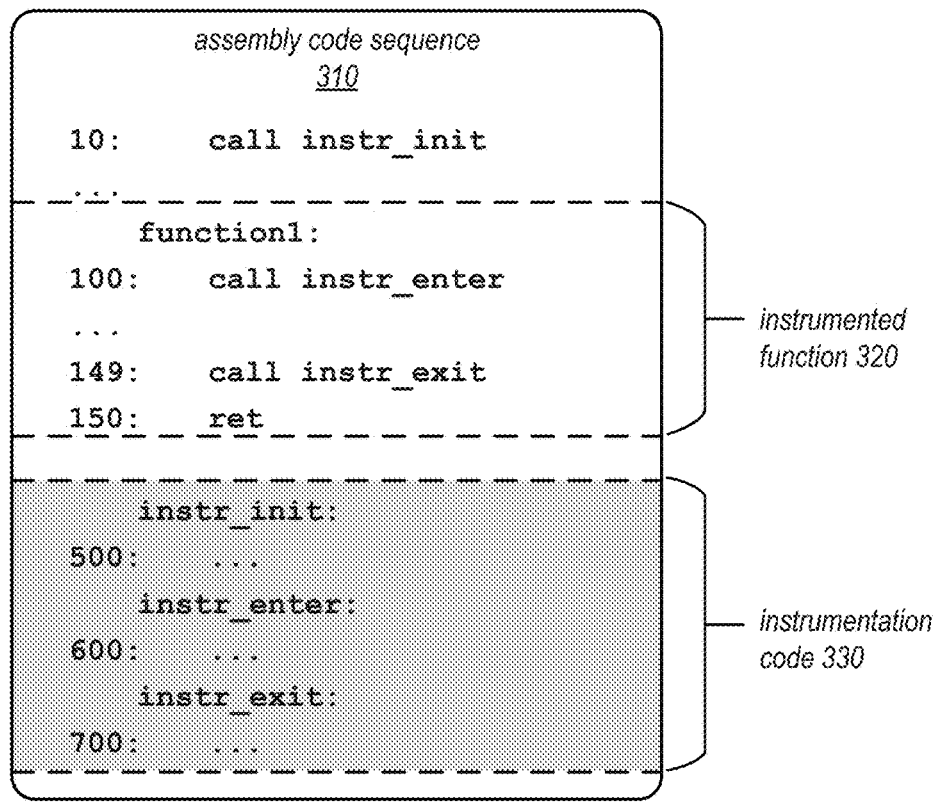
FIGS. 3A and 3B illustrate an example compile-time code transformation that can be used to add code instrumentation to an executable, according to some embodiments.
Figure 3B:
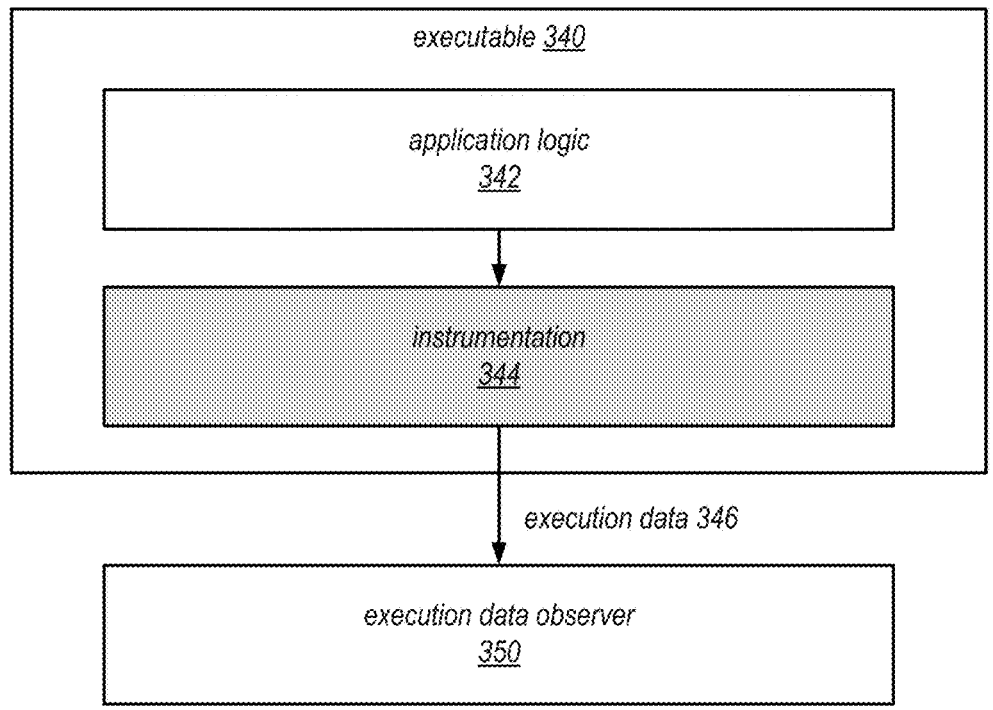

FIGS. 3A and 3B illustrate an example compile-time code transformation that can be used to add code instrumentation to an executable, according to some embodiments.

In some embodiments, the software system to be compiled may need to be instrumented to collect execution data of the system. Such instrumentation may be used to for example monitor particular components in the system, for example, to count different types of execution-time data and output logging data, etc. Code instrumentation may be employed to perform a variety of functions, such as code tracing, debugging and exception handling, profiling, performance monitoring, and data logging. In some embodiments, the instrumentation may be added at the assembly code level, as shown.

As shown in FIG. 3A, in assembly code sequence 310, instrumentation code 330 has been added. The instrumentation code 330 includes three functions that are called from the sequence 310, for example at lines 10, 100, and 149. In this example, the instrumentation may be used to monitor a instrumented function 320 such as function 1. For example, the instr_init function may cause certain tracking data structures to be initialized. The function instr_enter may be called whenever execution enters function1, and the function instr_exit may be called whenever execution exits function1. The two functions instr_enter and instr_exit may be configured to implement various instrumentation functionality such as updating a counter, determining the execution time within function1, or recording the state of execution before and after function1. In some embodiments, the instrumentation code 330 may be implemented in a separate library. In some embodiments, the instrumentation code 330 may be inserted inline into functions such as function1.

In some embodiments, the instrumentation may be performed in addition to other custom code transformations performed during the compilation process. For example, in some embodiments, the compilation process may perform the security update as discussed in FIGS. 2B and 2C, and also an instrumentation as discussed in FIG. 3A. In some embodiments, the code instrumentation may be used to gather execution data that is related to the security update.

For example, in some embodiments, the code instrumentation may be used to track invocations of the replacement sequences, to determine the extent to which speculative execution is occurring at various points in the software, or to detect suspicious execution behavior that indicates an attack is taking place.

FIG. 3B illustrates an executable that has been instrumented via for example the technique discussed in connection with FIG. 3A. As shown, the instrumented executable 340 includes application logic 342 and instrumentation 344. The application logic 342 may be used to implement the actual functionality of the executable 340, while the instrumentation 344 may be custom instrumentation added to collect and report execution data 346 of the executable.

As shown, using the instrumentation 344, the execution data 346 may be extracted from an execution of the executable 340, either during execution or after. The execution data 346 may then be provided to an execution data observer 350, which may perform more sophisticated analysis on the data. The execution data 346 may be communicated in a variety of different manners. For example, in some embodiments, the instrumentation may provide an API that can be called to retrieve the collect data, or in some cases control the data collection. In some embodiments, the instrumentation 344 may implement a callback interface so that the execution data observer 350 may react in real time to the execution data. In some embodiments, the instrumentation 344 may simply output the execution data 346, which may then be capture in a log file or a data store.

The execution data observer 350 may perform a variety of different analysis or take a variety of actions based on the execution data 346. For example, in some embodiments, the observer 350 may use the data to determine code coverage, for example, to determine if different execution paths in the executable 340 have been sufficiently exercised, or to detect dead code in the executable 340. In some embodiments, the observer 350 may use the data to generate a execution heatmap of the executable 340. In some embodiments, the heatmap may report execution counts of functions or modules during an execution. In some embodiments, the heatmap may also report the amount of time spent within particular functions or modules, or the processor usage generated by particular functions or modules. In some embodiments, the observer 350 may be configured to detect potential attacks on the executable. For example, in some embodiments, the observer 350 may detect that a suspicious pattern of execution is taking place, which suggests an attack on the execution. The observer 350 may then report this detected pattern and the identity of the external actor that caused the pattern to an administrator. In some embodiments, the observer 350 may be configured to throttle or shutdown the external actor.

As discussed, such instrumentation may be one example code transformation stage that can be added during compilation using an intermediate code transformer. Such a code transformer may be used to add custom instrumentation capabilities to any compiler, without modifying the compiler to backport features to the compiler.

Figure 4:
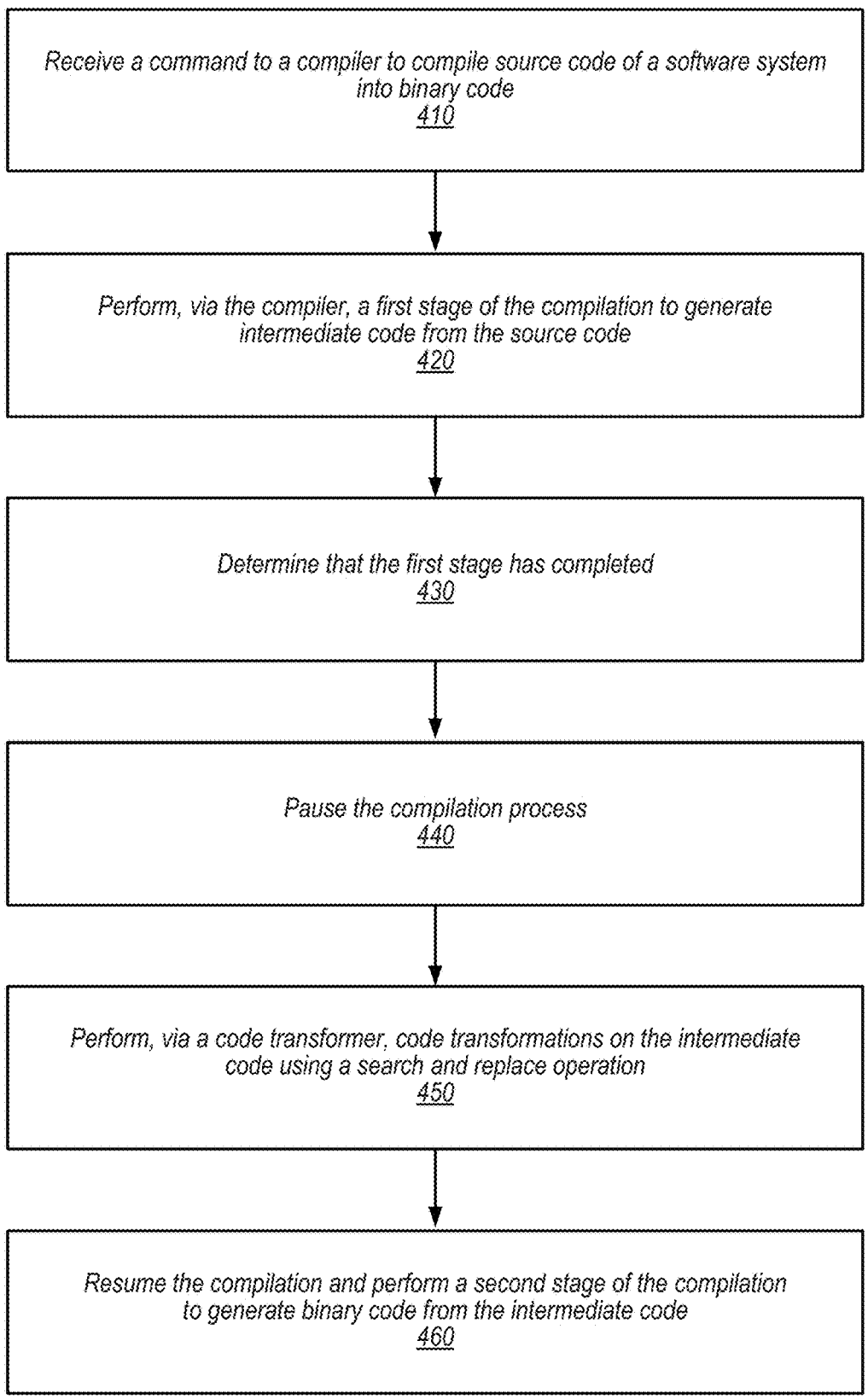
FIG. 4 is a flow diagram illustrating a process of generating binary code via a compiler system that performs custom code transformations into a compilation process, according to some embodiments.

FIG. 4 is a flow diagram illustrating a process of generating binary code via a compiler system that performs custom code transformations into a compilation process, according to some embodiments. In some embodiments, the process depicted in the figure may be performed by the wrapper program 120, as discussed in connection with FIG. 1.

The process beings at operation 410, where a command is received that is directed to a compiler to compile source code of a software system into binary code. In some embodiments, the command may be a command that is provided via a command line interface. In some embodiments, the command may be call provided via an API or a user interface, or a invocation from another software program. In some embodiments, the wrapper program may implement a command interface that replicates or augments the command interface of a compiler. The wrapper program may be configured to intercept commands directed to the compiler, for example, by configuring the invocation path of the compiler to refer instead to the wrapper program. In some embodiments, the wrapper program may parse the command parameters or flags associated with the command and use those commands to invoke the compiler in stages. The wrapper program may insert additional processing stages during the compiler stages, so as to augment the compile time functionality of the compiler with custom code transformations, etc.

At operation 420, a first stage of the compilation process is performed via the compiler to generate intermediate code from the source code. In some embodiments, this operation may be performed by the intermediate code generator 132 shown in FIG. 1. In some embodiments, the intermediate code may be a human readable assembly code whose instructions map to machine instructions for a target processor. For example, the intermediate code may be generated for a particular instruction set a processor family. In some embodiments, the wrapper program may add compiler parameters or flags to the received compiler command, so as to cause the intermediate code to be outputted. In some embodiments, the intermediate code may be stored to a persistent storage, for example, as one or more files in a designated file directory.

At operation 430, a determination is made that the first stage is completed. In some embodiments, the wrapper program may implement a handler for the compiler, so it can communicate with the compiler regarding the status of the first stage. In some embodiments, the wrapper program may wait for a return code from the compiler, which may indicate whether the first stage was completed successfully. In some embodiments, the wrapper program may cause the compiler to provide feedback during the first stage, for example, to output certain messages or warnings during the stage to a log file. In some embodiments, the wrapper program may examine the log file to determine if the first stage was completed in satisfactory fashion. Depending on the contents of the log file or other factors, the wrapper program may determine to move on to the next stage of compilation or halt. In some embodiments, the wrapper program may also examine the contents of an output directory to determine that the intermediate code files have been generated.

At operation 440, the compilation process is paused. In some embodiments, the wrapper program may break up the compilation process into multiple separate stages, so that custom code transformations may be performed between the compilation stages. In some embodiments, the wrapper program may break the compile command into multiple subcommands to the compiler, one for each stage of the compilation process. In this manner, the compilation process may be paused to perform additional tasks in between the stages.

At operation 450, code transformations are performed via a code transformer on the intermediate code generated. In some embodiments, the code transformations may be made based on a search and replace operation that searches for one pattern of intermediate code and replaces that code with another pattern of intermediate code. In some embodiments, the code transformations may be done in place on the existing code files. In some embodiments, the code transformations may produce a new set of intermediate code files. In some embodiments, the code transformations may be used to implement custom compile time features that are not available in the compiler. For example, in some embodiments, the transformations may implement a security update. As discussed, in one type of security update, the intermediate code may be transformed to replace indirect branch instructions that are subject to hardware speculative execution with other instructions that are not as vulnerable to branch-prediction-based attacks. In some embodiments, the code transformations may also add instrumentation to collect, analyze, or report execution data during the execution of the software system.

At operation 460, the compilation is resumed, and a second stage of the compilation is performed to generate binary code from the transformed intermediate code. In some embodiments, this operation may be performed by the wrapper program by invoking the compiler with a second subcommand. In some embodiments, the wrapper program may first check the outcome of the code transformations in the previous operation, and either proceed with the compilation process or halt the compilation process due to certain error conditions. In some embodiments, depending on the input flags or parameters of the original compiler command, the binary code may be unlinked object code, or one or more fully linked executables. In some embodiments, the resulting binaries are stored to a persistent location, such as for example an output file directory.

Figure 5:
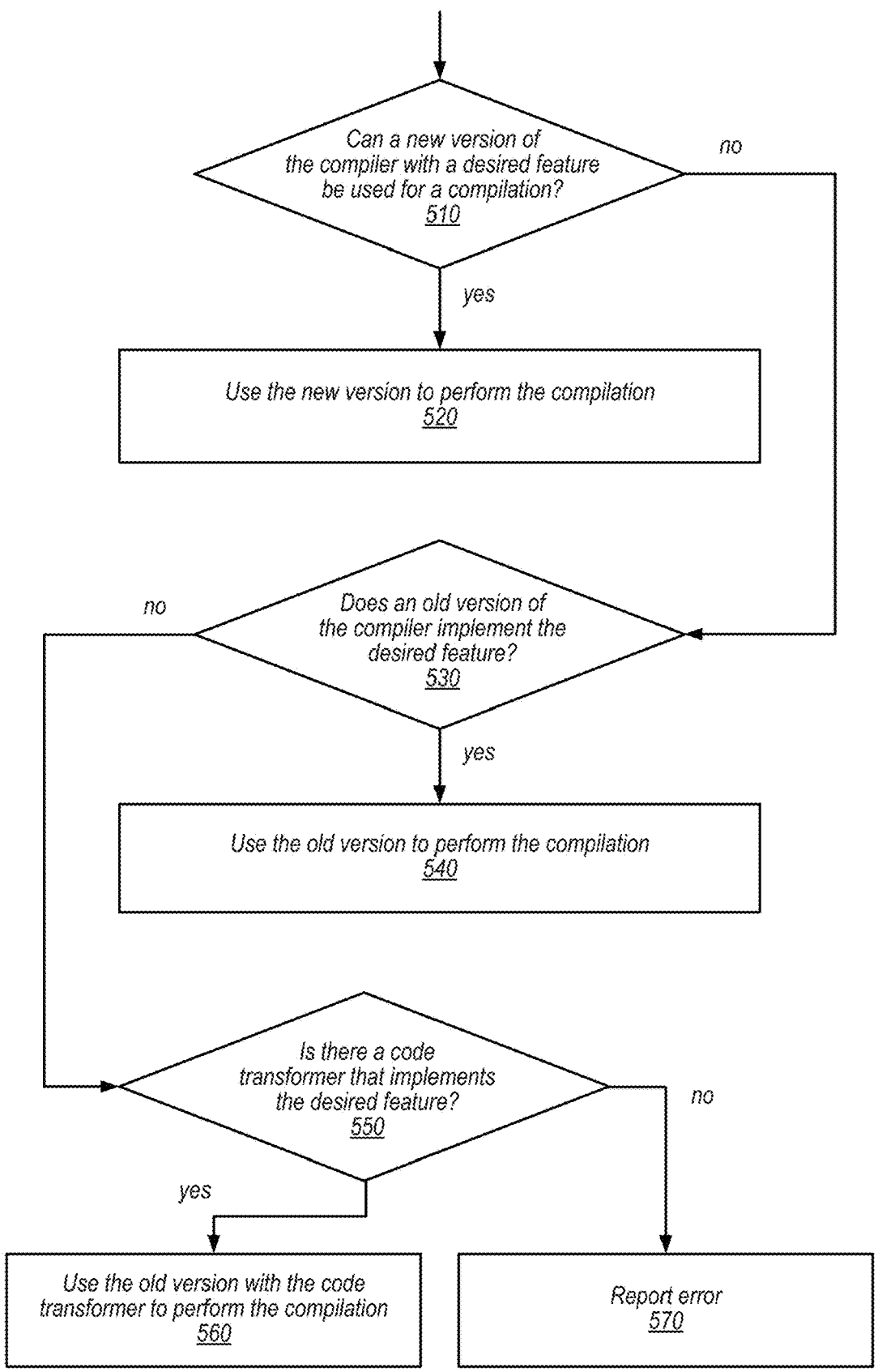
FIG. 5 is a flow diagram illustrating a process of determining to use a custom code transformation during a compilation process with a version of a compiler, according to some embodiments.

FIG. 5 is a flow diagram illustrating a process of determining to use a custom code transformation during a compilation process with a version of a compiler, according to some embodiments. In some embodiments, the process may be performed by a compiler tool that is configured to programmatically build a variety of software. For example, in some embodiments, the tool may be a part of a build manager that is used to build or rebuild different types of software using different types or versions of compilers. In some embodiments, the tool may be a part of a system that programmatically generates software patches. In some embodiments, the process may be carried out by software owner who would like to recompile a software using a desired compiler feature.

At operation 510, a determination is made whether a new version of the compiler with the desired feature can be used to perform the compilation. As discussed, in some embodiments, it may not be possible to use the new version of the compiler for a variety of reasons. For example, in some embodiments, the source code may not compile under the new version at all. In some embodiments, the source code is written with heavy assumptions about an old compiler, so that extensive changes to the source code are required to have it compile under the new version. In some embodiments, the source code may contain optimizations that are only correct for or compatible with the old compiler. In some embodiments, the compilation may be used to generate a hot patch that must be compiled using the same compiler version as the software to be patched. In some embodiments, the compiler tool may access metadata for the software system to be built and determine from the metadata that only certain versions of compilers are compatible with that system. In some embodiments, the compiler tool may also determine from metadata associated with the compiler that certain compiler features are or are not implemented by the compiler. For a variety of other reasons, it may be determined that a newer version of the compiler may not be used to perform a compilation. If the determination at operation 510 is yes, the process proceeds to operation 520, where the software is compiled with the new compiler version. If the determination is no, the process proceeds to operation 530.

At operation 530, a determination is made whether an old version of the compiler implements the desired compiler feature. As discussed, in some cases, compiler providers do not backport new compiler features in new compiler versions to all of the older versions. Moreover, backporting new compiler features into older versions is not a simple task. Depending on the embodiment, such missing features may include features such as recent security updates, custom code instrumentations, or a variety of other compile time features. As discussed, in some embodiments, a compiler tool may access metadata associated with a version of the compiler to determine whether the version does or does not implement certain compiler features. If the determination at operation 530 is yes, the process proceeds to operation 540, where the software is compiled using the old compiler version. If the determination is no, the process proceeds to operation 550.

At operation 550, a determination is made whether there is a code transformer that implements the desired feature. In some embodiments, the code transformer or desired feature may be carried out completely on an intermediate code that is generated from the compilation process. Thus, such code transformation stages may be easily inserted into the compilation process without modifying the compiler itself. For example, in some embodiments, certain compile time features may be implemented using one or more search and replace operations on the intermediate code. If the determination at operation 550 is yes, the process proceeds to operation 560, where the software is compiled using the old version of the compiler plus the code transformer. As discussed, such a compilation may be performed using a technique where the compiler's stages are broken up to obtain the intermediate code, and then performing the code transformations on the intermediate code. In some embodiments, the compilation process may be managed using a wrapper program.

If the determination at operation 550 is no, the process proceeds to operation 570, where an error is reported. The software owner is left with few options in this situation. For example, the software owner may develop a code transformer that implements the desired compiler feature, if possible, and then attempt the compilation using the new transformer. Alternatively, the software owner must either change the source code to compile under the new version of the compiler or modify the compiler to backport the desired feature into the old version of the compiler. As discussed, these latter options may be difficult and time-consuming.

Figure 6:
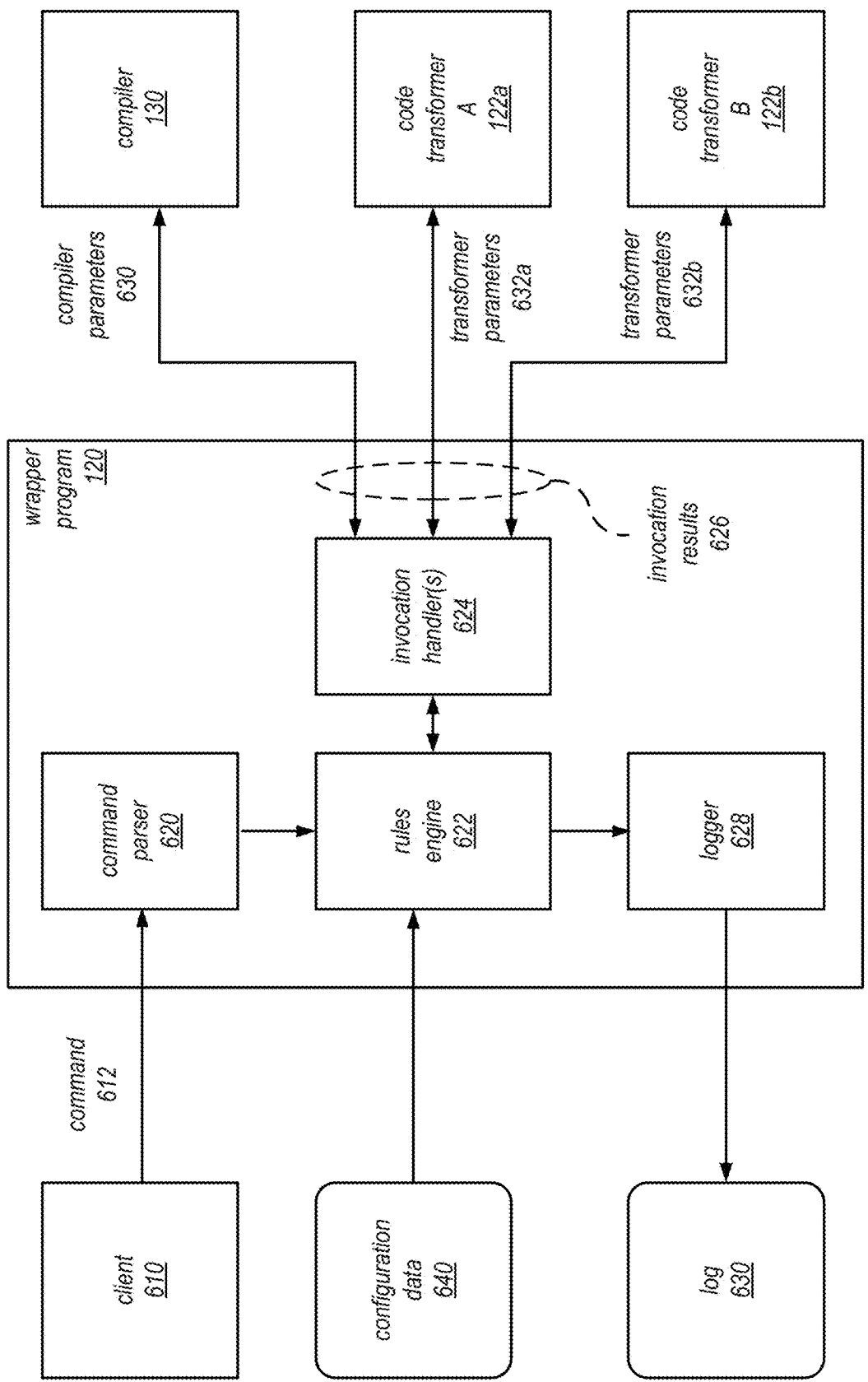
FIG. 6 illustrates a wrapper program that may be used to implement a compiler system that performs custom code transformations into a compilation process, according to some embodiments.

FIG. 6 illustrates a wrapper program that may be used to implement a compiler system that performs custom code transformations into a compilation process, according to some embodiments.

As shown, the wrapper program 120 may be invoked by a client 610. Depending on the embodiment, the client 610 may be a user or another program, such as a build script. In some embodiments, the wrapper program 120 may be invoked via a command 612, which may be modified by one or more input parameters. In some embodiments, the wrapper program 120 may present an invocation interface that is the same as, is similar to, or augments the invocation interface of the compiler 130. For example, the wrapper program 120 may be a script that accepts any command that is acceptable to the compiler 130. As discussed, in some embodiments, the wrapper program 120 may be configured to intercept all calls to the compiler 130, for example, by updating one or more execution paths or environment variables that are used to execute the compiler 130. In some embodiments, these variables may be set globally. In some embodiments, the variables may be set for only one user, or only a single execution session.

As shown, the wrapper program 120 may include a command parser 620. The command parser may take a received command and parse it to obtain the different input parameters. As shown, in some embodiments, the input parameters may include both compiler parameters 630 and transformer parameters 632a and 632b. In some embodiments, the compiler parameters 630 may be documented command flags that are understood by the compiler. In some embodiments, the transformer parameters 632 may be additional command flags that control the operations of one or more code transformers 122a or 122b. For example, the command flags may specify what transformations or search-and-replace operations the code transformer should perform.

As shown, the wrapper program 120 may include one or more invocation handlers 624, which may be responsible for invoking and communicating with the different components such as the compiler 130 and the different code transformers 122a and 122b. For example, in some embodiments, the wrapper program 120 may be implemented as a shell script that issues commands to the operating system to launch the various components as executables. In some embodiments, the invocation handler 624 may invoke the other components via in-process APIs. In some embodiments, the other components may be ongoing processes or services, and the invocation handler 624 may communicate with these processes using inter-process communication protocols.

As shown, in some embodiments, the different components that are invoked may return invocation results 626 to their handler(s). Depending on these results, the wrapper program 120 may determine how the compilation process should proceed, for example, via the aid of a rules engine 622. In some embodiments, the invocation results 626 may simply a return code from the invoked components, which may indicate success or failure of the compilation stage. In some embodiments, what is returned may be a composite return code or a data structure, which indicates additional details (e.g., warnings) about the stage. In some embodiments, the invocation results may be logged to a log file, which may be examined by the invocation handler(s) to determine the outcome of the stage. In some embodiments, the invocation handlers may check that expected output (e.g. intermediate files) have been produced. In some embodiments, the invocation handler may decide to halt the compilation process based on the invocation results of particular components. For example, if the compiler fails to produce a set of intermediate code files due to a failure, the wrapper program 120 may not proceed to the code transformation stage.

In some embodiments, the invoker 422 may make multiple invocations to a component. For example, in the case of the compiler 130, the invoker may call the compiler first time with a first set of compiler parameters 424 to generate the intermediate code. Subsequently, the invoker may call the compiler another time with different compiler parameters 424 to translate the intermediate code to the ultimate binary code.

As shown, in some embodiments, there may be more than one code transformer that may be used during the compilation process. In some embodiments, the multiple code transformers may be called in series to apply multiple transformations to the intermediate code. In some embodiments, the wrapper program 120 may select the code transformer to use, based on things such as the input parameters or invocation results. For example, in some embodiments, the input parameters may specify a selection flag that specifies which code transformers to use. In some embodiments, the wrapper program 120 may take a first pass to examine the intermediate code to determine whether certain conditions or sequences exist in the code. Depending on the results of the examination, different code transformers 122 may be used.

As shown, in some embodiments, the wrapper program 120 may include a rules engine 622. In some embodiments, the rules engine 622 may maintain a number of configurable rules in memory, so as to control the flow of the wrapper program. In some embodiments, such configurable rules may be specified in configuration 640, which may indicate these rules in a configuration file or a configuration data store. In some embodiments, these rules may be read and written by an administrator of the compilation process.

In some embodiments, the rules engine 622 may contain rules that determines which code transformations to apply. In some embodiments, the selection may be dependent on the input parameters to the wrapper program. In some embodiments, the selection may be based on code features or patterns seen in the intermediate code or the results of previous compilation stages. In some embodiments, the rules may specify a series of search and replace operations to perform on the intermediate code, which may be done in a single pass or multiple passes. In some embodiments, search and replace operations may be specified using regular expressions.

As shown, in some embodiments, the wrapper program 120 may include a logger 628. The logger 628 may be configured to generate a log 630 of captured events during the compilation process. In some embodiments, the log 630 may be stored as one or more files. In some embodiments, the log 630 may be stored to a structured data store. In some embodiments, the log 630 may include all or some of the logged information produced by the compiler 130. In some embodiments, the log 630 may include additional log information generated by the code transformers 122. For example, in some embodiments, the log 630 may include information indicating which code modules, functions, or lines where changed by each code transformer 122. In some embodiments, log 630 may include a before-and-after view of certain sequences of code.

Figure 7:
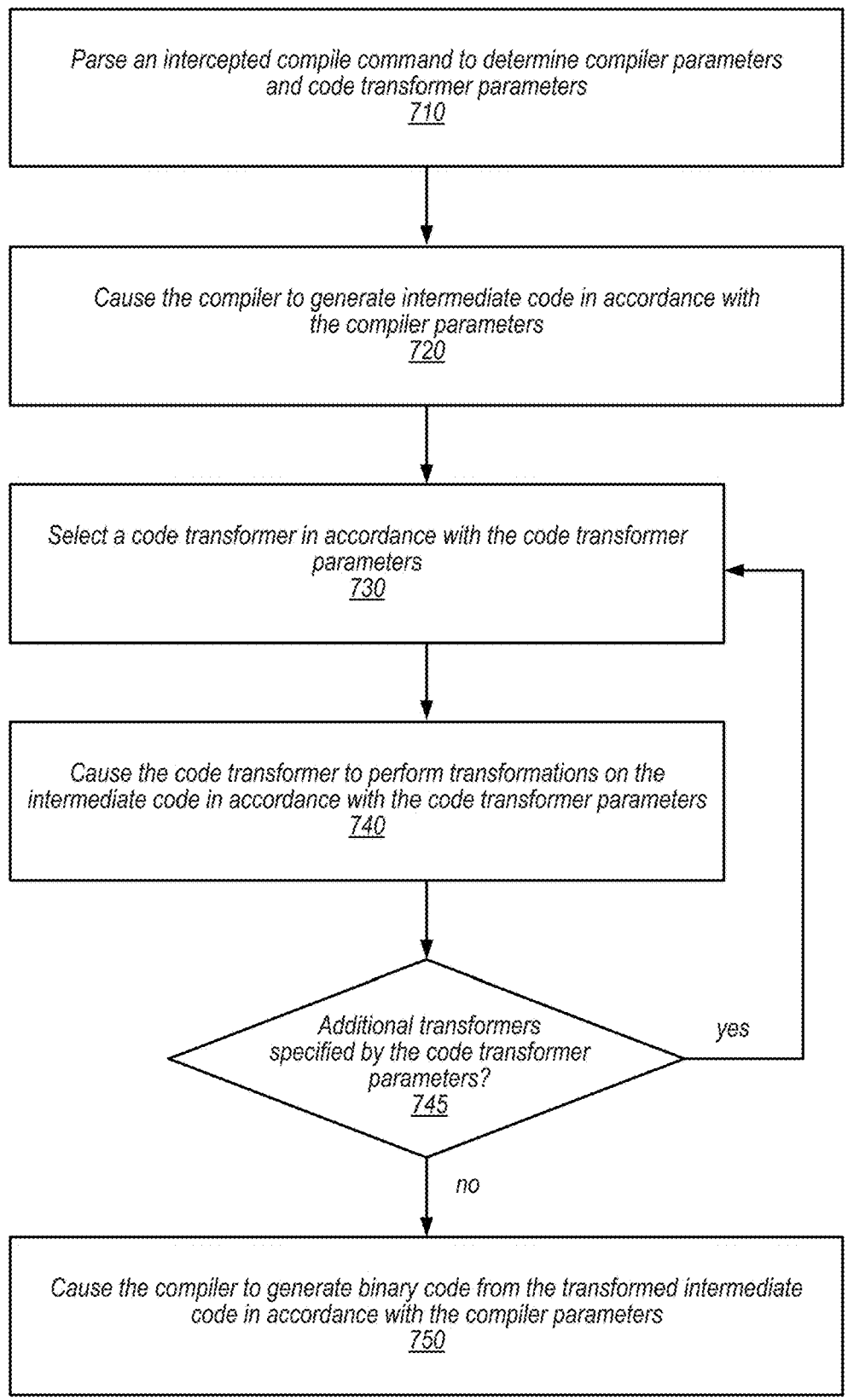
FIG. 7 is a flow diagram illustrating a process of performing a compilation using wrapper program to perform custom code transformations, according to some embodiments.

FIG. 7 is a flow diagram illustrating a process of performing a compilation using wrapper program to perform custom code transformations, according to some embodiments. The illustrated process may be performed, in some embodiments, by the wrapper program 120 of FIG. 1.

The process begins at operation 710, where an intercepted compile command is parsed to determine compiler parameters and code transformation parameters. As discussed, in some embodiments, a compiler command may be intercepted. In some embodiments, the command may include command parameters that are to be passed to the compiler. In some embodiments, the command may include additional commands that control how custom code transformers will operate. In some embodiments, the wrapper program may parse these command parameters and use these parameters to control the flow of the compilation process.

At operation 720, the compiler is caused to generate intermediate code in accordance with the compiler parameters. For example, in some embodiments, the wrapper program may invoke the compiler to generate intermediate code, such as assembly code, into one or more assembly code files. In some embodiments, the wrapper program may add an input parameter to invoke the compiler, to cause the compile to generate the assembly code. In some embodiments, the wrapper program may then receive output from the compiler (e.g., a return value, data structure, or logged output in a log file), and detect that the intermediate code is successfully generated. In some embodiments, the wrapper program may pause the compilation process to apply custom code transformations.

At operation 730, a code transformer is selected in accordance with the code transformer parameters. For example, in some embodiments, the code transformer parameters may specify that the compilation process should apply different code transformations as additional compilation stages, and in a particular order. In some embodiments, the wrapper program may select the indicated transformers from a registry of code transformers that are accessible to the wrapper program. In some embodiments, the wrapper program may implement logic to prefer certain transformers over others. For example, in some embodiments, the wrapper program may automatically choose the newest available version of a code transformer with different versions.

At operation 740, the code transformer selected is used to perform code transformations on the intermediate code in accordance with the code transformer parameters. In some embodiments, the parameters may specify what sorts of transformations should be applied. In some embodiments, the transformations may involve a search and replace operation that searches for a code pattern and replaces it with another code pattern. In some embodiments, a single code transformation may be applied multiple times, or repeatedly until some convergence condition is reached. In some embodiments, the code transformations may be used to apply a security update to the intermediate code, for example, to replace vulnerable indirect branch instructions with safer sequences that are not easily exploitable with branch-prediction-based attacks. In some embodiments, the transformations may be used to add code instrumentation to the intermediate code to collect runtime data from the software. In some embodiments, code sequences, functions, or modules that are modified by the code transformers may additionally be marked with a marker, which is preserved in the ultimate binary code. In some embodiments, this marker may be used in a later analysis of the binary, or to generate a hot patch to include only those functions or modules that were modified.

At operation 745, a determination is made whether additional transformers are specified by the code transformer parameters. For example, in some embodiments, the code transformer parameters may indicate a sequence of two, three, or four transformations be applied. In some embodiments, the wrapper program may determine on its own, based on results of earlier transformations, that additional code transformations are needed. Accordingly, the wrapper program may continue to apply code transformations in a loop, until no further code transformations are indicated or needed.

When all of the code transformations are performed, the process then proceeds to operation 750, where the compiler is caused to generate binary code from the transformed intermediate code, in accordance with the compiler parameters. In some embodiments, the binary code may be unlinked object code. In some embodiments, the binary code may be one of more fully linked executables. Because all of the custom code transformations are done on the intermediate code, which generates valid intermediate code to the later compiler stages, the compiler is able to convert the intermediate code to binary code without error. However, by using the code transformers, the resulting binary code includes modifications from the compiler features that were not implemented in the compiler.

Figure 8:
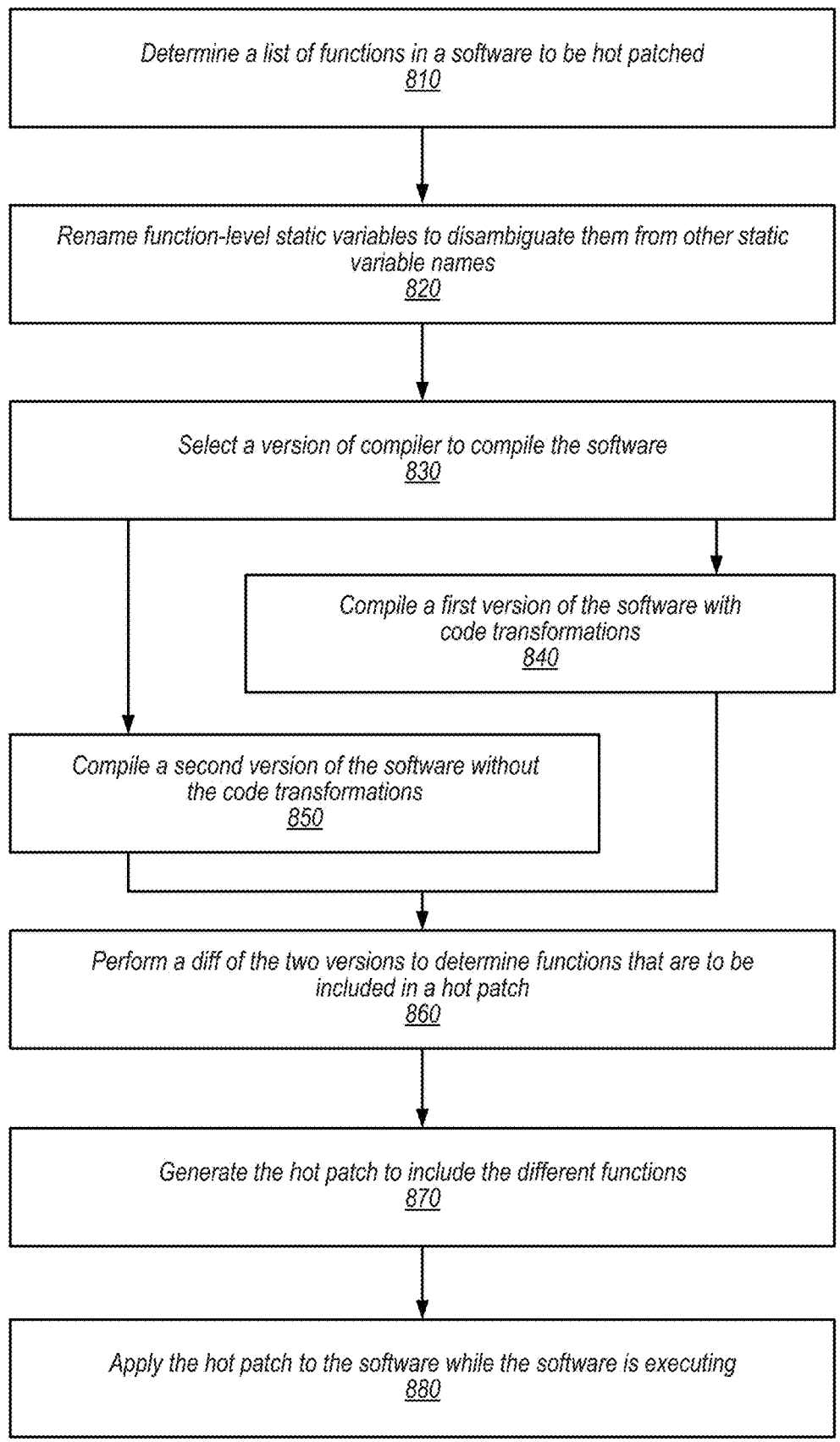
FIG. 8 is a flow diagram illustrating a process of generating a hot patch containing custom code transformations perform during a compilation process, according to some embodiments.

FIG. 8 is a flow diagram illustrating a process of generating a hot patch containing custom code transformations perform during a compilation process, according to some embodiments.

At operation 810, a list of functions in a software to be hot patched is determined. In some embodiments, the hot patch will contain updated binaries to change the behavior of the software. In some embodiments, a hot patch will allow the update to be made to the software without a full redeployment of the software. In some embodiments, the hot patch will allow the software to be updated while the software is executing. A hot patch may be used to update a software in situations where the software must be continually running, for example, as platform software to support other software. In some embodiments, the software to be hot patched may be a hypervisor in a service provider network that supports virtual machine instances leased to customers. As may be understood, when the hypervisor software is updated, it is undesirable to shut down the hypervisor (and therefore all of the virtual machine instances) in order to perform the update.

In some embodiments, the hot patch may implement a security update where certain vulnerable functions that may be exploited by guest virtual machines are patched to mitigate the vulnerability. In some embodiments, the list of functions may be provided via a previous analysis. In some embodiments, the list of functions may contain functions that are controllable or invokable by guest virtual machines. In some embodiments, the functions may contain particular vulnerabilities, such as the use of indirect branching instructions, which in some embodiments may be executed speculatively.

In some embodiments, the source code may be scanned by different scanners to determine functions that should be included in the hot patch. Depending on the reason for the patch, the scanning may be performed manually or using a programmatic scanner. In some embodiments, a single patch may include multiple updated features, so that the list of functions may be an aggregation of multiple scans.

At operation 820, certain function-level static variables in the source code are renamed to disambiguate them from other static variable names. In some embodiments, the compiler may rename these static variable names in a preprocessing step, in order to avoid collision in these static variable names, which are global in scope. In some embodiments, the compiler may simply append a counter to the variable name in an implementation-specific way. In some embodiments, minor changes in the code, for example the adding of a single function, will cause all of the static variable names generated by the compiler to change. This change is undesirable in a number of contexts. For example, a binary diff that compares to versions of binaries generated from the compiler will have difficulty matching up the static variable names if their compiler-generated counting scheme changes between the two versions. Accordingly, in some embodiments, in anticipation of the binary diff, the process may include a preprocessing step that preemptively renames these static variables in a customized and semantically meaningful way, so that no naming collisions are possible. In some embodiments, the renaming may employ a hierarchical naming convention, which modifies the variable name with the function that it is defined in, and also a hash that is generated from the function's unique namespace. In some embodiments, the naming scheme may use counters for static variables defined in unnamed scopes.

At operation 830, a version of the compiler is selected to compile the software. In some embodiments, the selection may be performed in a similar fashion as described in FIG. 5. In some embodiments, to generate a hot patch, the compiler used must be the same version as the compiler that was used to compile the software being patched. In some embodiments, however, different versions of compilers may be used. In some embodiments, different compilers may be used to generate the two different versions of the software to be diffed, as shown in operations 840 and 850.

At operation 840, a first version of the software is compiled with code transformations. In some embodiments, the code transformations may be custom transformations that implements a compiler feature that is not in the version of the compiler being used. In some embodiments, the code transformations are needed to produce the updates in the hot patch. For example, in some embodiments, intermediate code sequences may be replaced in the intermediate code by the code transformations, and these code transformations are the reason for the update to be delivered via the hot patch. In some embodiments, the first version may be generated using the approach described in FIG. 4, which may insert a code transformation stage into the compilation process.

At operation 850, a second version of the software is compiled without the code transformations. In some embodiments, the second version may be generated with command flags or parameters specifying that no custom code transformations are to be performed during the compilation. The reason for the second version is to generate a baseline version of the binary code, so that a diff may be performed to see which functions or code modules were affected by the code transformations.

At operation 860, a diff of the two versions is performed to determine functions or code modules that are to be included in the hot patch. In some embodiments, the diff may be performed using a binary diff tool. In some embodiments, the diff operation may report particular functions or code modules that are different between the two versions, and thus, need to be updated in the existing version of the software.

It should be the diffing technique is just one example way of determining the contents of the hot patch. In other embodiments, other techniques may be used. As one example, in some embodiments, the code transformers may mark the intermediate code sequences, functions, or modules as they perform the transformations. These markings may be preserved through to the binary code. In some embodiments, the hot patch generator may simply examine the binary code and include in the hot patch any code modules or functions that were marked by the intermediate code transformers.

At operation 870, the hot patch is generated to include the determined functions, which were changed by the code transformations. In some embodiments, the hot patch may be a package of binary files that will replace corresponding binary files in the execution repository of the current version of the software. In some embodiments, the hot patch may include a self-executor that copies the contents of the hot patch to their proper locations.

At operation 880, the hot patch is applied to the software while the software is executing. As discussed, one of the advantages of the hot patch approach is that they allow software to be updated without extensive downtime. In some embodiments, once the binaries are installed at appropriate locations in the code repository of the software, the execution components may be loaded dynamically into the execution memory of the software. In some embodiments, the software may perform a shutdown and restart at a convenient point. For example, in some embodiments, a hypervisor instance may warn or relocate its current hosted virtual machine instances, and then restart itself with new binaries.

Figure 9A:
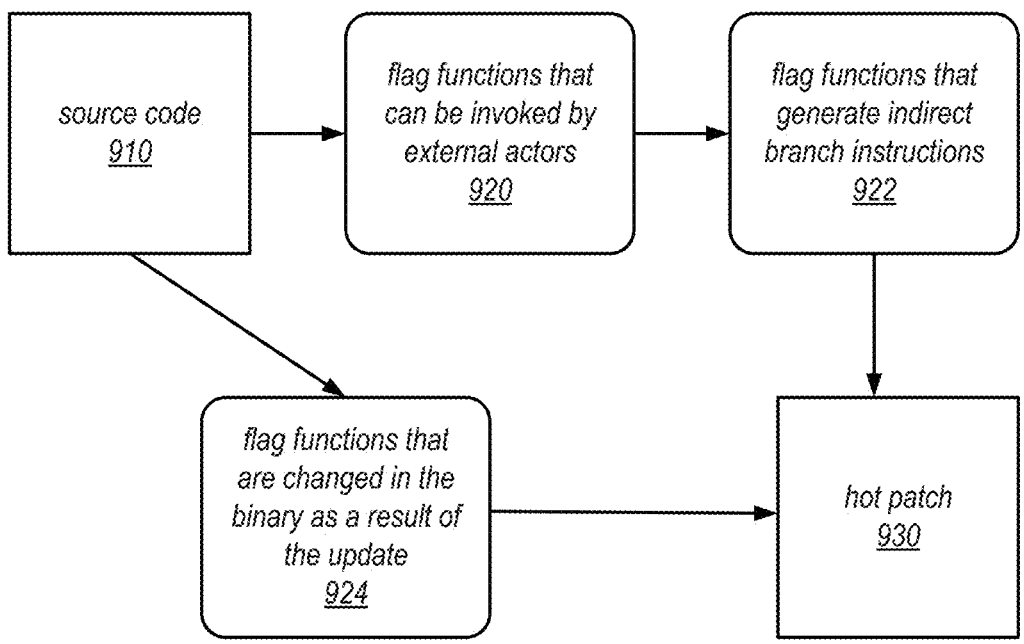
FIGS. 9A and 9B illustrate example processes to generate a hot patch that includes custom compile-time code transformations, according to some embodiments.
Figure 9B:
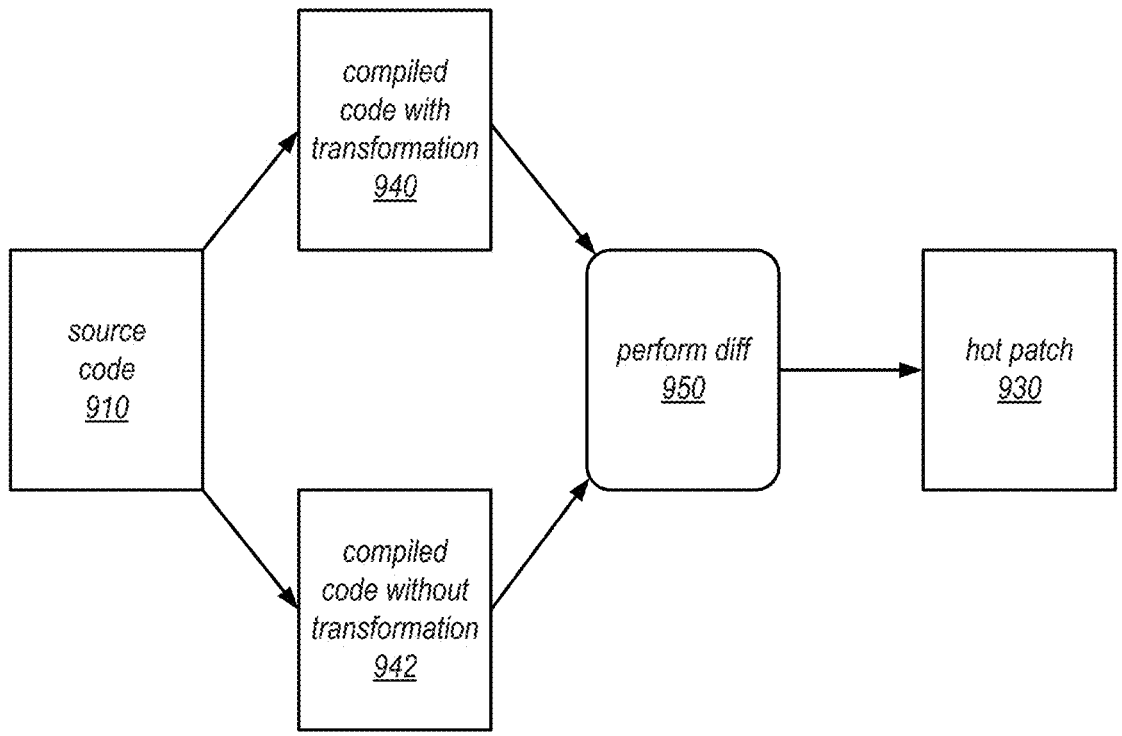

FIGS. 9A and 9B illustrate example processes to generate a hot patch that includes custom compile time code transformations, according to some embodiments.

FIG. 9A depicts a selection process that determines the functions that are to be included in a hot patch. This process may be used, for example, to generate a hot patch for a software platform that is to be updated to apply a security patch to mitigate branch-prediction-based attacks. In some embodiments, the target software system may be a hypervisor, an operating system, or some other type of execution container or hosting platform. As discussed, in some embodiments, such attacks may involve an external actor to the software system, such as guest virtual machines or programs executing on an operating system, or a client of the software system. The attackers may exploit the speculative execution indirect branch instructions in the software system to obtain privileged information from the system. Thus, to mitigate these sorts of attacks, the software system may be patched to replace vulnerable indirect branch instructions with safer code sequences.

In some embodiments, a hot patch 930 is generated to apply the security update. This is because in many cases, these types of platform software are being used in a manner where they cannot be easily shut down to apply the patch. For example, the software owner may be running a service provider network that relies on a hypervisor to host virtual machine instances for different customers. In this scenario, it is unpractical and undesirable to shut down the physical servers or the hypervisors in order to apply the security update. Accordingly, a hot patching solution is employed to apply the security update.

As shown, the source code 910 may be examined in a series of steps to determine that contents should be included in the ultimate hot patch 930. In some embodiments, functions or code modules in the software may be flagged to be included in the hot patch. In some embodiments, it is desirable that the size of the hot patch be kept relatively small. The smaller size of the hot patch achieves a number of benefits such as a faster update process, lower risk of errors during the update process, and reduced complexity during the building of the hot patch.

As shown, in a first flagging step 920, the source code 910 may be scanned for those functions that can be invoked by external actors. As may be understood, only those functions that can be controlled or invoked by external attackers can be exploited in a branch-prediction-based attack. Thus, only these types of externally controllable functions need to be patched. In some embodiments, this filter step may be performed in a one-time analysis of the code base.

As shown, in a second flagging step 922, the resulting functions from the first flagging step 920 may be further filtered for functions that generate indirect branch instructions. As may be understood, because the branch-prediction-based attacks exploit speculative execution of these types of instructions, the security update will only replace these types of instructions. Thus, code that is known to generate indirect jump and call instructions are included in the hot patch 930. In some embodiments, this flagging step 922 may be performed at the intermediate code level. Thus, the compilation process may first generate intermediate code for a larger set of functions, and then scan the intermediate code for these functions to find indirect branch instructions. If such instructions are found, the function or module is flagged for code transformation and inclusion in the hot patch 930.

As shown, in some embodiments, the hot patch 930 may be augmented with a second source of functions or code modules, for example, in a separate flagging step 924. For example, in some embodiments, functions or code modules that are determined to have changed as a result of any updates in the patch may be additionally flagged to be included in the hot patch 930. In some embodiments, operation 924 may be performed at the intermediate code level, or at the binary code level, for example, via a binary cliff. In some embodiments, the hot patch 930 may be generated to implement multiple feature updates. Thus, there may be multiple flagging passes for each feature update, and all flagged functions or code modules are aggregated in the hot patch 930.

FIG. 9B depicts another process to determine the contents of the hot patch 930. In some embodiments, the process of FIG. 9B may be performed in conjunction with the process of FIG. 9A. In some embodiments, the process of FIG. 9B may be used to implement flagging step 922 of FIG. 9A.

As shown, in this process, the source code 910 is compiled two times, a first time 940 with a code transformation, and a second time 942 without the code transformation. For example, the code transformation may scan generated intermediate code and replace all instances of indirect branch instructions with replacement code sequences. In some embodiments, a diff 950 is then performed to compare the two compiled versions. In some embodiments, the diff may be a binary diff that is performed on generated binary code. In some embodiments, the diff may be a diff of human-readable intermediate code. In some embodiments, the diff may produce a set of functions or code modules that were changed by the code transformations performed on the compiled version 940. Accordingly, the changed functions or code modules are included in the hot patch 930.

Figure 10A:
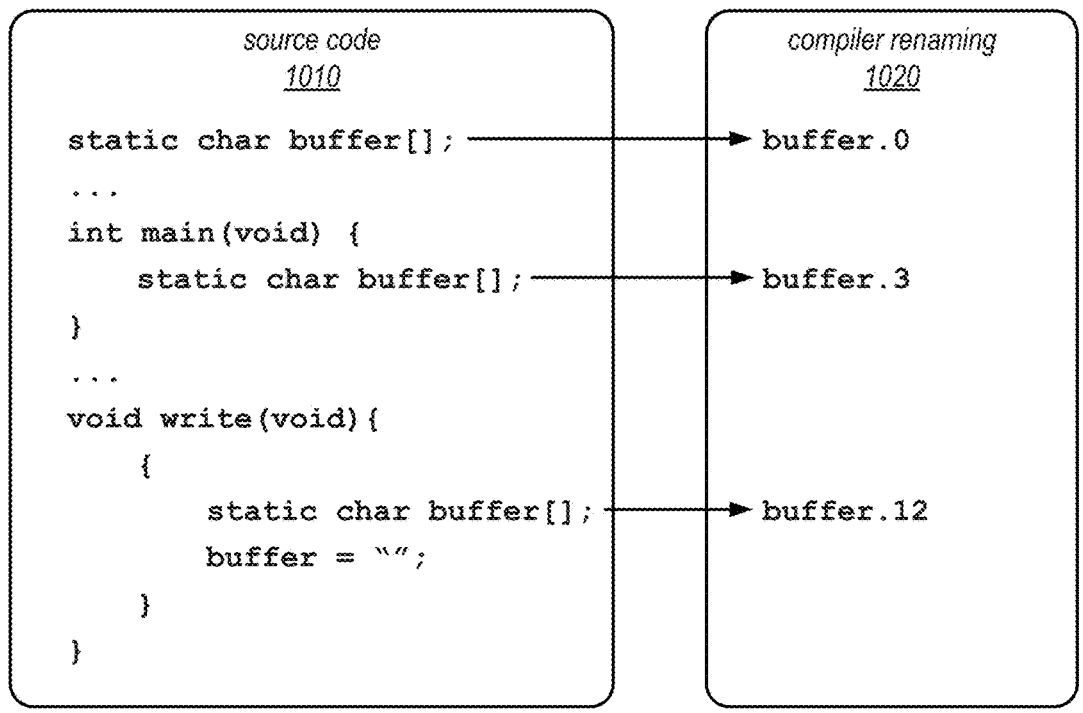
FIGS. 10A and 10B illustrate a renaming technique to rename static variable names during a compilation process that performs custom code transformations, according to some embodiments.
Figure 10B:
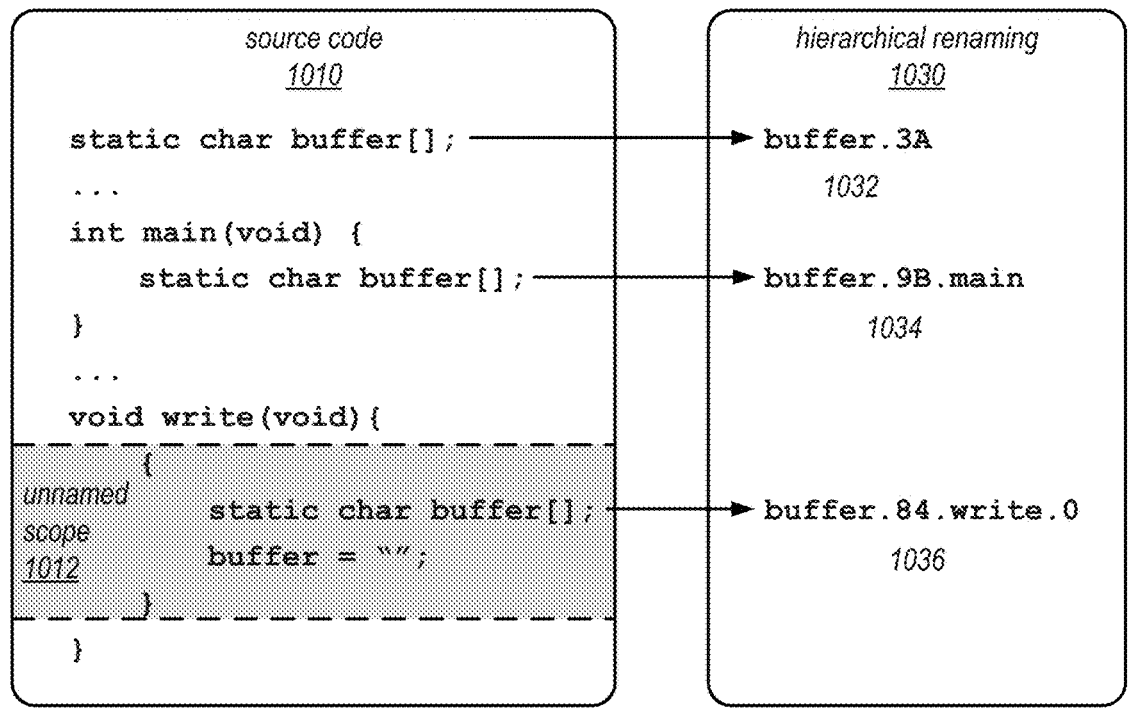

FIGS. 10A and 10B illustrate a renaming technique to rename static variable names during a compilation process that performs custom code transformations, according to some embodiments.

FIG. 10A illustrates a compiler renaming 1020 of different instances of static variables in a section of source code 1010. As may be understood, in some programming languages, such as the C language, static variables may be defined. These static variables have scope that extend beyond the function in which they are defined. When variables are defined this way, they are not allocated on the calling stack, whose contents get deallocated when as functions terminate. Rather, they are allocated in a part of the execution memory that persists throughout the entire execution of the program. Based on the programming language specification, these variable names only need to be unique within their defining function. However, at compile time, the compiler will have to assign them a new name that is globally unique, to disambiguate them from other static variables that have the same name.

In some embodiments, as shown, the compiler may maintain a counter that is appended to different occurrences of the static variable name. For example, in the illustrated example, three different static variables having the same variable name "buffer" are defined. These definitions are valid under the programming language standard. At compile time, the compiler will generate globally unique names for these three variables by, for example, appending the counter value to the names. As shown, the first instance of "buffer" becomes "buffer.0," the second instance becomes "buffer.3,"

and the third instance becomes "buffer.12." In general, the behavior of this counter is dependent on many things in the source code. For example, a small change to add a function in the source code may cause the compiler to update the counter differently, and thus generate different variable names in the binary.

This issue causes a number of difficulties in the compilation process. In one respect, the different variable names will confuse certain diff tools, so that two compiled versions of the largely similar source code will appear to have large differences, because the diff tool is not able to match up the variable names between the two versions. As discussed, in some embodiments, such a diff tool may be used in a process to generate a hot patch. This problem becomes significant when a large number of functions are modified for the hot patch.

To overcome such problems, in some embodiments, the compiler system may implement a stage where these static variable names are preemptively renamed. The renaming may uniquely assign to the variable a name that is globally unique, so that they cannot collide with other static variable names. As a result, the diff tool is able to match up the variable names between two slightly different versions of the compiled code. In some embodiments, the renaming may be performed at the preprocessing stage, for example, to make inline changes in the source code. In some embodiments, the renaming may be performed on the intermediate or assembly code using an intermediate code transformer. In some embodiments, the wrapper program may permit a code transformer to be inserted at the source code processing stage, so that a custom transformation may be perform either before or after the standard preprocessing performed by the compiler.

As shown, in FIG. 10B, the same static variable names in the source code 1010 are renamed 1030 using a hierarchical renaming. In this example, the static variable names are appended with an additional modifier which indicates the name of the function that they were defined in, along with a hash that is computed from the global namespace of that function. For example, the resulting variable name 1034 includes the original variable name "buffer," followed by a hash value "9B" indicating the namespace of the function "main," and then the name of the function "main." In some embodiments, static variables that are defined outside of any functions (e.g. variable name 1032) may not have the appended function name. In some embodiments, static variables may be defined in unnamed scopes within functions, such as unnamed scope 1012, so that the colliding static variable names may exist within the same function. To disambiguate these variable names, the renaming may append a counter value to the variable name indicating each successive unnamed scope in the function. For example, as shown, variable name 1036 ends in a "0," which indicates that the static variable name was defined in the first unnamed scope 1012 in the function "write."

As may be understood, by using this renaming technique 1030, the compilation does not have to rely on the default renaming scheme 1020 used by the compiler. As discussed, the compiler's counter-based renaming scheme is difficult to predict and control, and accordingly, a small change to the source code may cause a massive change in the naming of the static variables. By using the hierarchical naming scheme 1030, the variable names may be kept generally consistent across code changes. This consistency in variable naming allows operations such as binary diffs to be more easily performed.

Figure 11:
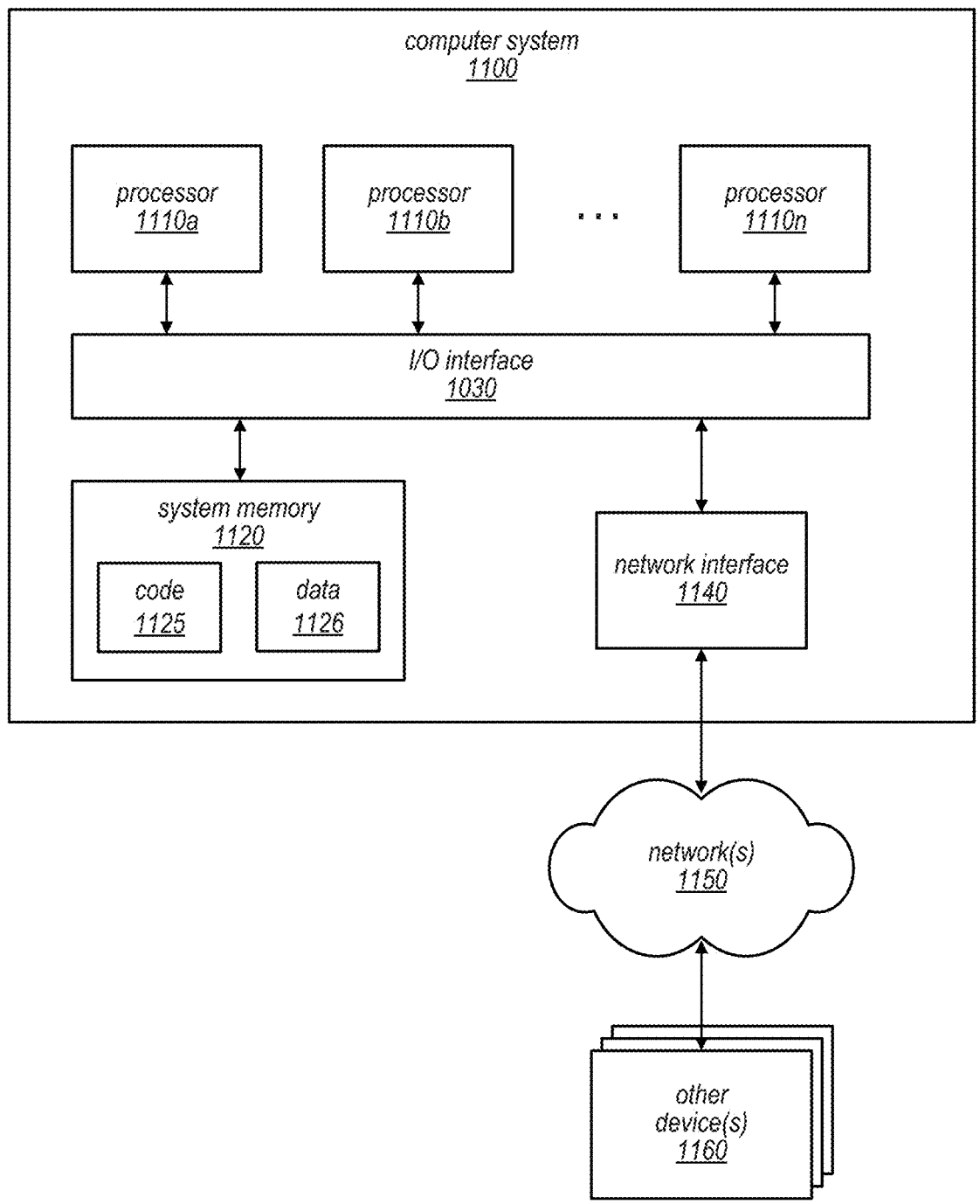
FIG. 11 is a block diagram illustrating an example computer system that can be used to host a compiler system that performs custom code transformations into a compilation process, according to some embodiments.

FIG. 11 is a block diagram illustrating an example computer system that can be used to host a compiler system that performs custom code transformations into a compilation process, according to some embodiments. Computer system 1100 may include or be configured to access one or more nonvolatile computer-accessible media. In the illustrated embodiment, computer system 1100 includes one or more processors 1110 coupled to a system memory 1120 via an input/output (I/O) interface 1130. Computer system 1100 further includes a network interface 1140 coupled to I/O interface 1130.

In various embodiments, computer system 1100 may be a uniprocessor system including one processor 1110, or a multiprocessor system including several processors 1110 (e.g., two, four, eight, or another suitable number). Processors 1110 may be any suitable processors capable of executing instructions. For example, in various embodiments, processors 1110 may be general-purpose or embedded processors implementing any of a variety of instruction set architectures (ISAs), such as the x86, PowerPC, SPARC, or MIPS ISAs, or any other suitable ISA. In multiprocessor systems, each of processors 1110 may commonly, but not necessarily, implement the same ISA.

System memory 1120 may be configured to store instructions and data accessible by processor(s) 1110. In various embodiments, system memory 1120 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 1120 as code 1125 and data 1126. The system memory 1120 may include different levels of cache, some of which may be located on the CPU and some away from the CPU. One level of the cache hierarchy may be a last level cache that is shared by all of the processors 1110a to 1110n. The last level cache may be an inclusive cache of the low levels of cache in the cache hierarchy.

In one embodiment, I/O interface 1130 may be configured to coordinate I/O traffic between processor 1110, system memory 1120, and any peripheral devices in the device, including network interface 1140 or other peripheral interfaces. In some embodiments, I/O interface 1130 may perform any necessary protocol, timing or other data transformations to convert data signals from one component (e.g., system memory 1120) into a format suitable for use by another component (e.g., processor 1110). In some embodiments, I/O interface 1130 may include support for devices attached through various types of peripheral buses, such as a variant of the Peripheral Component Interconnect (PCI) bus standard or the Universal Serial Bus (USB) standard, for example. In some embodiments, the function of I/O interface 1130 may be split into two or more separate components, such as a north bridge and a south bridge, for example. Also, in some embodiments some or all of the functionality of I/O interface 1130, such as an interface to system memory 1120, may be incorporated directly into processor 1110.

Network interface 1140 may be configured to allow data to be exchanged between computer system 1100 and other devices 1160 attached to a network or networks 1150, such as other computer systems or devices, such as routers and other computing devices, as illustrated in FIGS. 1 through 10, for example. In various embodiments, network interface 1140 may support communication via any suitable wired or wireless general data networks, such as types of Ethernet network, for example. Additionally, network interface 1140 may support communication via telecommunications/telephony networks such as analog voice networks or digital fiber communications networks, via storage area networks such as Fibre Channel SANs, or via any other suitable type of network and/or protocol.

In some embodiments, system memory 1120 may be one embodiment of a computer-accessible medium configured to store program instructions and data as described above for FIGS. 1 through 10 for implementing embodiments of methods and apparatus for traffic analysis. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1100 via I/O interface 1130. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computer system 1100 as system memory 1120 or another type of memory. Further, a computer-accessible medium may include transmission media or signals such as electrical, electromagnetic, or digital signals, conveyed via a communication medium such as a network and/or a wireless link, such as may be implemented via network interface 1140.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A system, comprising:
one or more processors with associated memory that implements:
a compiler; and
a wrapper program configured to:
intercept a command to the compiler to perform a compilation of source code into binary code;
determine, based at least in part on a configuration for the compilation, to add an additional stage to the compilation to execute a code transformer that implements a compiler feature not implemented in the compiler, wherein the code transformer is distinct from the compiler and configured to modify an assembly code generated during the compilation;
perform, via the compiler, a first stage of the compilation in accordance with the command, wherein the first stage generates the assembly code from the source code;
responsive to a determination that the first stage is completed:
pause the compilation;
perform, via the code transformer distinct from the compiler, a code transformation on the assembly code to produce a modified assembly code, wherein the code transformation transforms one or more code sequences in the assembly code based at least in part on a search and replace operation that replaces one code pattern with another code pattern; and
resume the compilation and perform, via the compiler, a second stage of the compilation, wherein the second stage generates the binary code from the modified assembly code.

2. The system of claim 1, wherein the compiler feature is implemented in a newer version of the compiler that is incompatible with the source code and the compilation is performed using an older version of the compiler that is compatible with the source code.

3. The system of claim 1, wherein to perform the code transformation, the code transformer is configured to apply a security update to the assembly code, wherein the security update replaces indirect branch instructions that are subject to hardware speculative execution.

4. The system of claim 1, wherein:
the source code was previously compiled into a software system using the compiler, and
to generate the binary code, the wrapper program is configured to generate a hot patch for the software system.

5. The system of claim 4, wherein to generate the hot patch, the wrapper program is configured to:
determine a list of functions that are different between a first version and a second version of binary code, wherein the first version is generated using the code transformer and the second version is generated without using the code transformer; and
include in the hot patch the list of functions.

6. A method, comprising:
receiving configuration for a compilation of a source code into a binary code, wherein the compilation is to be performed with a version of a compiler;

determining, based at least in part on the configuration, to add an additional stage to the compilation to execute a code transformer that implements a compiler feature not implemented in the version of the compiler, wherein the code transformer is distinct from the compiler and configured to modify an intermediate code generated during the compilation;

detecting, during the compilation, that the compiler has completed a first stage of the compilation, wherein the first stage generates the intermediate code from the source code;

responsive to the detection:
pausing the compilation;
performing, via the code transformer distinct from the compiler, a code transformation on the intermediate code to produce a modified intermediate code, wherein the code transformation replaces one or more code sequences in the intermediate code with one or more respective sequences; and
sending a command to the compiler, wherein the command causes the compiler to resume the compilation and perform a second stage of the compilation, wherein the second stage generates the binary code from the modified intermediate code.

7. The method of claim 6, wherein said determining to add the additional stage to the compilation to execute the code transformer is performed based at least in part on one or more code patterns detected in the intermediate code.

8. The method of claim 6, wherein the compiler feature is implemented in a newer version of the compiler that is incompatible with the source code and the version of the compiler used to perform the compilation is compatible with the source code.

9. The method of claim 6, wherein performing the code transformation comprises applying a security update to the intermediate code, wherein the security update replaces indirect branch instructions that are subject to hardware speculative execution.

10. The method of claim 9, wherein performing the code transformation comprises adding instrumentation code to the intermediate code, wherein the instrumentation code collects execution data of the binary code at runtime.

11. The method of claim 6, wherein generating the binary code comprises generating a hot patch to update a software system, and further comprising:
applying the hot patch to the software system while the software system is executing.

12. The method of claim 11, wherein generating the hot patch comprises:
determining a list of functions that are different between a first version and a second version of binary code, wherein the first version is generated using the code transformer and the second version is generated without using the code transformer; and
including the list of functions in the hot patch.

13. The method of claim 12, further comprising:
prior to determining the list of functions that are different:
identifying a static variable name in the source code that is defined in a function but whose scope extends outside the function, wherein the compiler is configured to perform a renaming of the static variable name to disambiguate the static variable name from other static variable names in the source code; and
renaming, via another code transformer distinct from the compiler, the static variable name to a globally unique name in the source code.

14. The method of claim 11, wherein performing the code transformation comprises marking one or more functions that are modified by the code transformation; and wherein generating the hot patch comprises including in the hot patch the one or more functions that are marked.

15. The method of claim 11, wherein generating the hot patch comprises:
determining a first set of vulnerable functions in the software system to be hot patched with a security update implemented by the code transformation;
determining a second set of functions in the software system whose intermediate code is changed as a result of the code transformation; and
including functions in the first or second sets in the hot patch.

16. The method of claim 6, further comprising:
intercepting, at a wrapper program, another command to the compiler, wherein the wrapper program is configured to perform:
causing the compiler to perform the first stage of the compilation according to the other command;
causing the code transformer to perform the code transformation on the intermediate code; and
causing the compiler to perform the second stage of the compilation according to the other command.

17. The method of claim 16, further comprising:
parsing one or more command parameters associated with the other command to determine one or more compiler parameters and one or more transformer parameters; and
selecting the code transformer to use during the compilation from a plurality of different code transformers based at least in part on the one or more transformer parameters.

18. A non-transitory computer-accessible storage medium storing program instructions that when executed on one or more processors cause the one or more processors to:
receive configuration for a compilation of a source code into a binary code, wherein the compilation is to be performed with a compiler;
determine, based at least in part on the configuration, to add an additional stage to the compilation to execute a code transformer that implements a compiler feature not implemented in the compiler, wherein the code transformer is distinct from the compiler and configured to modify an intermediate code generated during the compilation;
detect, during the compilation, that the compiler has completed a first stage of the compilation, wherein the first stage generates the intermediate code from the source code;
responsive to the detection:
pause the compilation;
perform, via the code transformer distinct from the compiler, a code transformation on the intermediate code to produce a modified intermediate code, wherein the code transformation replaces one or more code sequences in the intermediate code with one or more respective sequences; and
send a command to the compiler, wherein the command causes the compiler to resume the compilation and perform a second stage of the compilation, wherein the second stage generates the binary code from the modified intermediate code.

19. The non-transitory computer-accessible storage medium of claim 18, wherein to perform the code transformation, the program instructions when executed on one or more processors cause the one or more processors to apply a security update to the intermediate code, wherein the security update replaces indirect branch instructions that are subject to hardware speculative execution.

20. The non-transitory computer-accessible storage medium of claim 18, wherein the program instructions when executed cause the one or more processors to:
- intercept, at a wrapper program, another command to the compiler, wherein the wrapper program is configured to:
  - cause the compiler to perform the first stage of the compilation in accordance with the other command;
  - cause the code transformer to perform the code transformation on the intermediate code; and
  - cause the compiler to perform the second stage of the compilation in accordance with the other command.

* * * * *